US012707135B2

(12) United States Patent
Brunet et al.

(10) Patent No.: US 12,707,135 B2
(45) Date of Patent: Aug. 11, 2026

(54) VIDEO EQUIPMENT PLATFORMS AND RELATED METHODS

(71) Applicant: Ross Video Limited, Iroquois (CA)

(72) Inventors: Jeffery Brunet, Maxville (CA); Ewan Smith, Ottawa (CA)

(73) Assignee: Ross Video Limited, Iroquois (CA)

(*) Notice: Subject to any disclaimer, the term of this patent is extended or adjusted under 35 U.S.C. 154(b) by 159 days.

(21) Appl. No.: 18/620,314

(22) Filed: Mar. 28, 2024

(65) Prior Publication Data

US 2025/0310623 A1 Oct. 2, 2025

(51) Int. Cl.

| | |
|---|---|
| ***H04N 23/54*** | (2023.01) |
| ***F16M 11/04*** | (2006.01) |
| ***F16M 11/18*** | (2006.01) |
| ***F16M 11/20*** | (2006.01) |
| ***H04N 23/695*** | (2023.01) |

(52) U.S. Cl.

CPC ........... *H04N 23/54* (2023.01); *F16M 11/046* (2013.01); *F16M 11/18* (2013.01); *F16M 11/2014* (2013.01); *H04N 23/695* (2023.01)

(58) Field of Classification Search

CPC .... H04N 23/54; H04N 23/695; F16M 11/046; F16M 11/18; F16M 11/2014

See application file for complete search history.

(56) References Cited

U.S. PATENT DOCUMENTS

| | | | | |
|---|---|---|---|---|
| 8,120,701 B2 * | 2/2012 | Mayer | .................. | H04N 23/695 348/374 |
| 2016/0201847 A1 | 7/2016 | Firchau et al. | | |

FOREIGN PATENT DOCUMENTS

| | | |
|---|---|---|
| CN | 115164001 A | 10/2022 |
| CN | 218850852 U | 4/2023 |

OTHER PUBLICATIONS

International Search Report mailed Jul. 7, 2025 for International Application No. PCT/CA2025/050382 filed Mar. 20, 2025 for Ross Video Limited, 7 pages.

* cited by examiner

*Primary Examiner* — Yogesh K Aggarwal

(74) *Attorney, Agent, or Firm* — Cesari and McKenna, LLP; Omar M. Wadhwa

(57) ABSTRACT

A video equipment platform includes a support structure, a movable frame, a video equipment cradle, and a drive system. The movable frame is coupled to and movable relative to the support structure. The video equipment cradle is coupled to and movable relative to the movable frame, to carry video equipment from within the movable frame. The drive system is coupled to the support structure, to the movable frame, and to the video equipment cradle, to move both the movable frame relative to the support structure and the video equipment cradle relative to the movable frame. The movable frame may be referred to as a telescoping or translating frame that slides along the support structure, to move the video equipment cradle within a wide range of motion. Related methods are also disclosed.

20 Claims, 17 Drawing Sheets

VIDEO EQUIPMENT PLATFORMS AND RELATED METHODS

FIELD

The present disclosure relates generally to video equipment and, in particular, to platforms for video equipment and related methods.

BACKGROUND

Currently available video camera platforms include telescoping columns, in which column elements extend and retract within each other. Such platforms have a base height, and accordingly a lowest camera position or shot height, that is dictated by the lower column element height. This makes it very difficult to have low shots, due to the lower column element height, and may also make high shots difficult as well. For example, three-piece columns are the most common, so reaching high shots requires longer column sections, which in turn impacts lowest shot height.

Fixed column architectures are possible, but have significant manufacturing challenges, and are not easily maneuverable between studios (standard doors) if they are designed to reach high shots for which camera height may be 2.0 m or higher. In addition, fixed architectures provide for either high shots or low shots, and not both.

Multi-joint robotic arms are illustrative of another possible type of architecture, but tend to be complex and expensive, and have limited weight carrying capabilities.

It remains a challenge to provide video equipment platforms that can support smooth motion over a wide range of heights, to allow for a greater range of on-air shots.

SUMMARY

In certain video equipment applications or usage scenarios such as camera robotics, smooth motion over as wide a range as possible is desirable. Embodiments disclosed herein can provide for both low and high shots, with architectures that avoid limitations of telescoping column platforms and fixed platforms and are less complex than multi-joint robot arm architectures.

According to an aspect of the present disclosure, a video equipment platform includes a support structure, a movable frame, a video equipment cradle, and a drive system. The movable frame is coupled to and movable relative to the support structure. The video equipment cradle is coupled to and movable relative to the movable frame, to carry video equipment from within the movable frame. The drive system is coupled to the support structure, to the movable frame, and to the video equipment cradle, to move both the movable frame relative to the support structure and the video equipment cradle relative to the movable frame.

Another aspect of the present disclosure relates to a method that involves providing a video equipment platform support structure, providing a movable frame coupled to and movable relative to the support structure, providing a video equipment cradle, coupled to and movable relative to the movable frame, to carry video equipment from within the movable frame, and providing a drive system. The drive system is coupled to the support structure, to the movable frame, and to the video equipment cradle, to move both the movable frame relative to the support structure and the video equipment cradle relative to the movable frame.

A method according to a further aspect of the present disclosure involves mounting video equipment to a video equipment cradle that is coupled to and movable relative to a movable frame of a video equipment platform. The video equipment cradle carries the video equipment from within the movable frame, and the movable frame is coupled to and movable relative to a support structure of the video equipment platform. Such a method may also involve controlling a drive system that is coupled to the support structure, to the movable frame, and to the video equipment cradle, to move both the movable frame relative to the support structure and the video equipment cradle relative to the movable frame.

Other aspects and features of embodiments of the present disclosure will become apparent to those skilled in the art upon review of the following description.

BRIEF DESCRIPTION OF THE DRAWINGS

Embodiments will be described, by way of example only, with reference to the accompanying figures.

DETAILED DESCRIPTION

Figure 1:
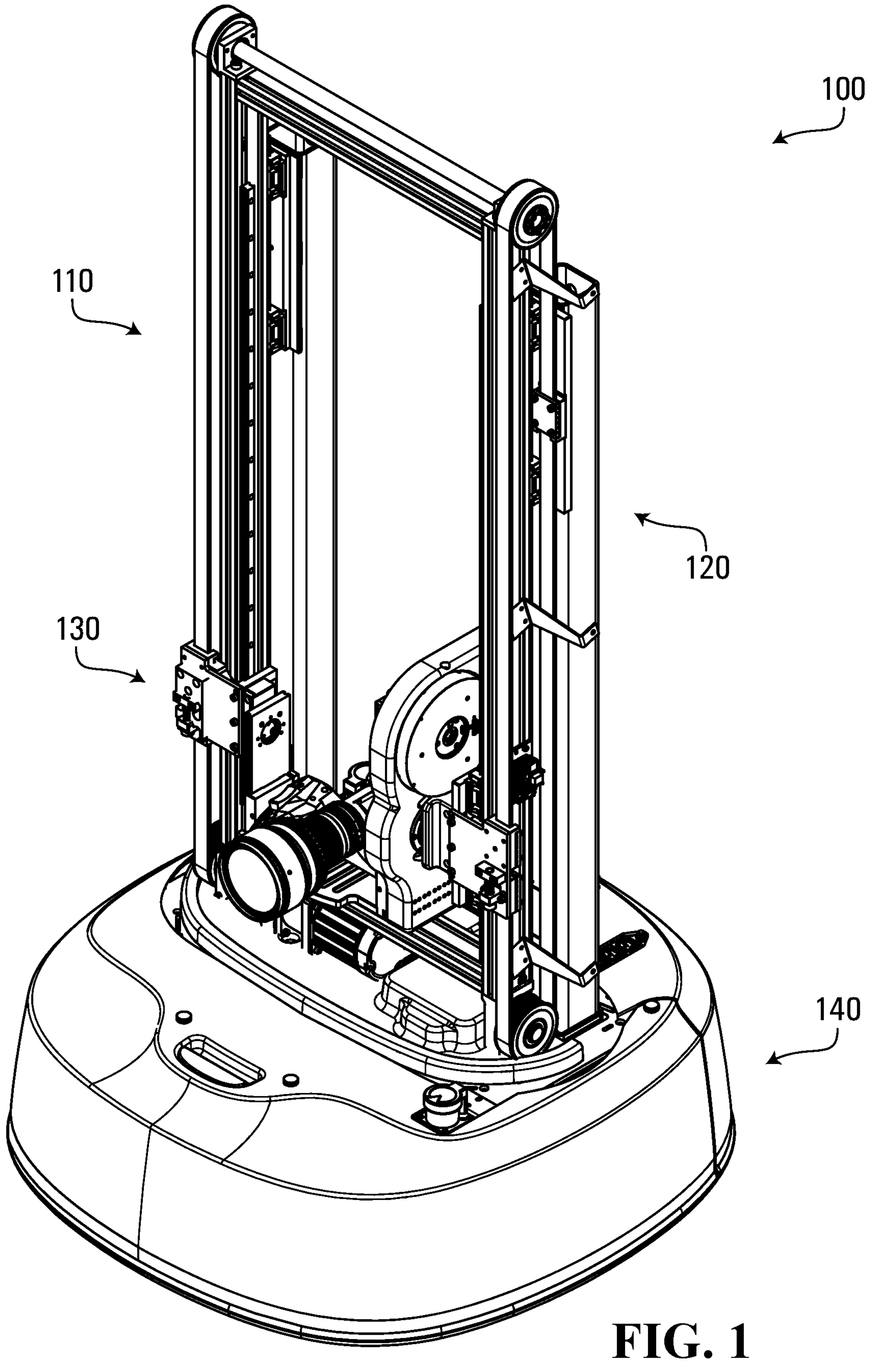
FIG. 1 is an isometric view of an example video equipment platform according to an embodiment.

Embodiments disclosed herein include, among others, platforms and methods related to video equipment. Examples of video equipment include video cameras, video displays, and prompters. Although potential benefits or advantages such as wide range of motion and shot height range may be particularly useful for video cameras, video equipment platforms as disclosed herein are not limited to any particular type of video equipment, or to only one piece of video equipment.

A video equipment platform may also or instead be referred to as a lift system or a lift on a base or dolly, for example. Embodiments are described herein primarily with reference to platforms, but other names may also or instead be used herein or elsewhere.

Some embodiments provide a multiple-stage platform, which includes a fixed stage and a translating stage. Such a platform may also or instead be described as a telescoping platform or lift. A fixed stage provides support for a translating stage, and accordingly is also referred to herein as a support structure. A translating stage is also referred to herein as a movable frame.

A video equipment cradle carries video equipment and is movable in tandem with the movable frame. Such a cradle is supported by the movable frame and moves with the movable frame, and is further movable relative to the movable frame.

A drive system, which may also or instead be referred to as a drive for example, is provided to move both a movable frame (relative to a support structure) and a video equipment cradle (relative to the movable frame).

These features, and others, are described in further detail and by way of example herein, with reference to the drawings. Views of an example video equipment platform 100 are shown in FIGS. 1 to 8.

The example video equipment platform 100 is illustrative of a platform that includes a support structure 120, a movable frame 110, and a video equipment cradle 130. The movable frame 110 is coupled to and movable relative to the support structure 120, and the video equipment cradle 130 is coupled to and movable relative to the movable frame. Such movement of the movable frame 110 relative to the support structure 120 and movement of the video equipment cradle 130 relative to the movable frame are perhaps most clearly evident from the views shown in FIGS. 6 to 8, which are described further below.

The video equipment cradle 130 is provided to carry video equipment (shown by way of example as a video camera 249 in FIG. 2) from within the movable frame 110. This is one unique aspect of video equipment platforms as disclosed herein. In telescoping column video camera platforms and fixed column architectures referenced above, a video camera is carried at a top of a column rather than from within a frame, and column size limits a lowest camera position and shot height. Multi-joint robotic arms carry a video camera at an end of an arm rather than within any sort of frame, and as such, multi-joint robot arm architectures may require more space for articulation to move a video camera through a full range of motion.

Another potential benefit of the video equipment cradle 130 carrying the video equipment from within the movable frame 110 is that the video equipment platform 100 can be move evenly balanced, from front to rear. If a payload is carried at the front or rear of a frame or support structure, for example, then a counterweight or other element may be needed to compensate for imbalance and improve stability.

This feature of carrying video equipment from within the movable frame 110 may also be described as supporting the video equipment from within the movable frame, or carrying or supporting the video equipment within the movable frame. This may, but need not necessarily, mean that the video equipment is fully located within the movable frame 110. As used herein, carrying or supporting the video equipment within or from within the movable frame 110 is intended to convey the notion that the video equipment is carried such that it is at least partially located within the movable frame. This is perhaps most clearly shown in FIGS. 2 and 3, in which the video camera 249 is carried not only between sides and ends of the movable frame 110, and in FIGS. 4 and 5, in which the video camera is also carried such that it is partially within a front-to-rear extent of the movable frame. Put another way, a point or base of support for the video equipment is at least partially within the movable frame 110, where side members of the video equipment cradle 130 (one of which is labelled 246 in FIG. 2) are coupled to brackets 242, 242 for example.

The movable frame 110 includes linear side rails 210, 212 (FIG. 2, for example) that are opposed to each other and extend parallel to each other, and linear end rails 214, 216 (also shown in FIG. 2, for example) that are opposed to each other. The linear end rails 214, 216 extend parallel to each other, between ends of the linear side rails 210, 212. In the example shown, the linear end rails 214, 216 extend inside the linear side rails 210, 212. In other embodiments, the linear end rails 214, 216 may extend across ends of the linear side rails 210, 212, or corner frame brackets form the corners of the frame and the side rails and the end rails do not extend past each other. The side rails and end rails may be coupled together in any of various ways, using fasteners, brackets, cooperating structures integrated with any or all of the side rails and the end rails, welded connections, and so on.

The support structure 120 similarly includes linear side rails 310, 312 (FIG. 3, for example) that are opposed to each other and extend parallel to each other (and parallel to the linear side rails 212, 210 of the movable frame 110) and are respectively coupled to the linear side rails of the movable frame. Coupling structures by which the linear side rails 210, 212 of the movable frame 110 and 312, 310 of the support structure 120 are coupled together are described by way of example at least below with reference to FIGS. 11 to 13.

A drive system is coupled to the support structure 120, to the movable frame 110, and to the video equipment cradle 130, to move both the movable frame relative to the support structure and the video equipment cradle relative to the movable frame. In the example video equipment platform 100, the drive system includes a belt drive at a first end (the bottom end in the example shown) of the linear side rails 210, 212 of the movable frame 110, a belt idler at a second end (the top end in the example shown) of the linear side rails of the movable frame, and belt extending between the belt drive and the belt idler and coupled to the support structure and to the video equipment cradle.

Herein, references to components at ends of the linear side rails do not restrict embodiments to such components being directly mounted to ends of the rails. Although the pulleys 222, 224, 232, 234 are shown by way of example in the drawings as being mounted to the ends of the linear side rails 210, 212, other embodiments are contemplated. It is intended that location of components at the ends of rails encompasses other arrangements in which such components are toward, adjacent to, or proximate to the ends of rails, without necessarily being directly mounted to or the ends of the rails. This also applies more generally to descriptions of component locations relative to other components or parts thereof, such as at an end, side, front, rear, top, or bottom of a linear rail, the movable frame 110, the support structure 120, the video equipment cradle 130, the base 140, or any other component of a video equipment platform.

The belt drive at the first end of the linear side rails 210, 212 may include a drive motor that is mounted to the movable frame 110. A drive motor 226 is shown FIG. 2, for example, and is mounted to the end rail 216 in the example shown. The drive motor 226 may be mounted outside (as shown) or inside the movable frame 110, but outside mounting of the drive motor may be preferred so that the video equipment cradle 130 has a greater range of motion inside the movable frame.

The belt drive may also include a respective drive pulley 224, 234 (FIG. 2, for example) at the first end of each of the linear side rails 210, 212 of the movable frame. The drive pulleys 224, 234 may be attached to an axle, which may be a rotor shaft of the drive motor 226, or may be coupled to a rotor or shaft of the motor indirectly, through gears or another form of a transmission for example. The axle for the drive pulleys 224, 234 may be coupled to the movable frame, by respective bearings or by respective brackets with bearings for example, so that the drive pulleys can be driven by the drive motor 226 and can rotate relative to the movable frame 110. In the case of the axle for the drive pulleys 224, 234 being the rotor shaft of the drive motor 226, the axle may or may not also be coupled to the movable frame if the rotor shaft is able to support the drive pulleys 224, 234 without additional structural reinforcement provided by coupling the axle to the movable frame 110.

The belt idler at the top of the movable frame 110 may include a respective idler pulley 222, 232 at the second end of each of the linear side rails 210, 212 of the movable frame. Each of the idler pulleys 222, 232 is coupled to an axle 236, at ends thereof, in the example shown. In some embodiments, the axle 236 is a fixed axle and the idler pulleys 222, 232 are rotatably coupled to the axle 236, by respective bearings for example, so that the idler pulleys are rotatable relative to the axle. The axle 236 may instead be rotatable with the idler pulleys 222, 232 and be rotatably coupled to (and rotatable relative to) the movable frame 110.

Figure 2:
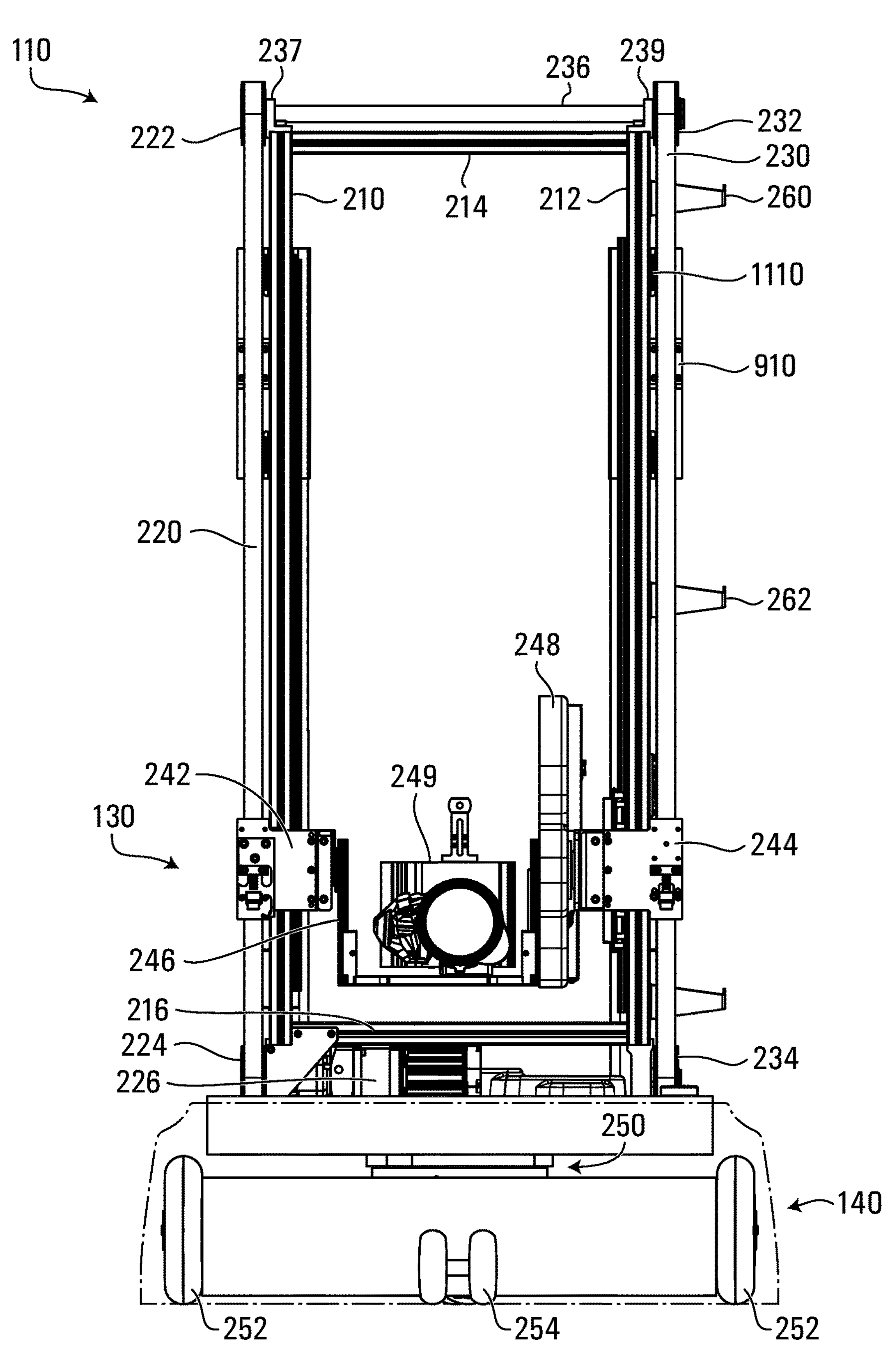
FIG. 2 is a front plan view of the example video equipment platform in FIG. 1.
Figure 3:
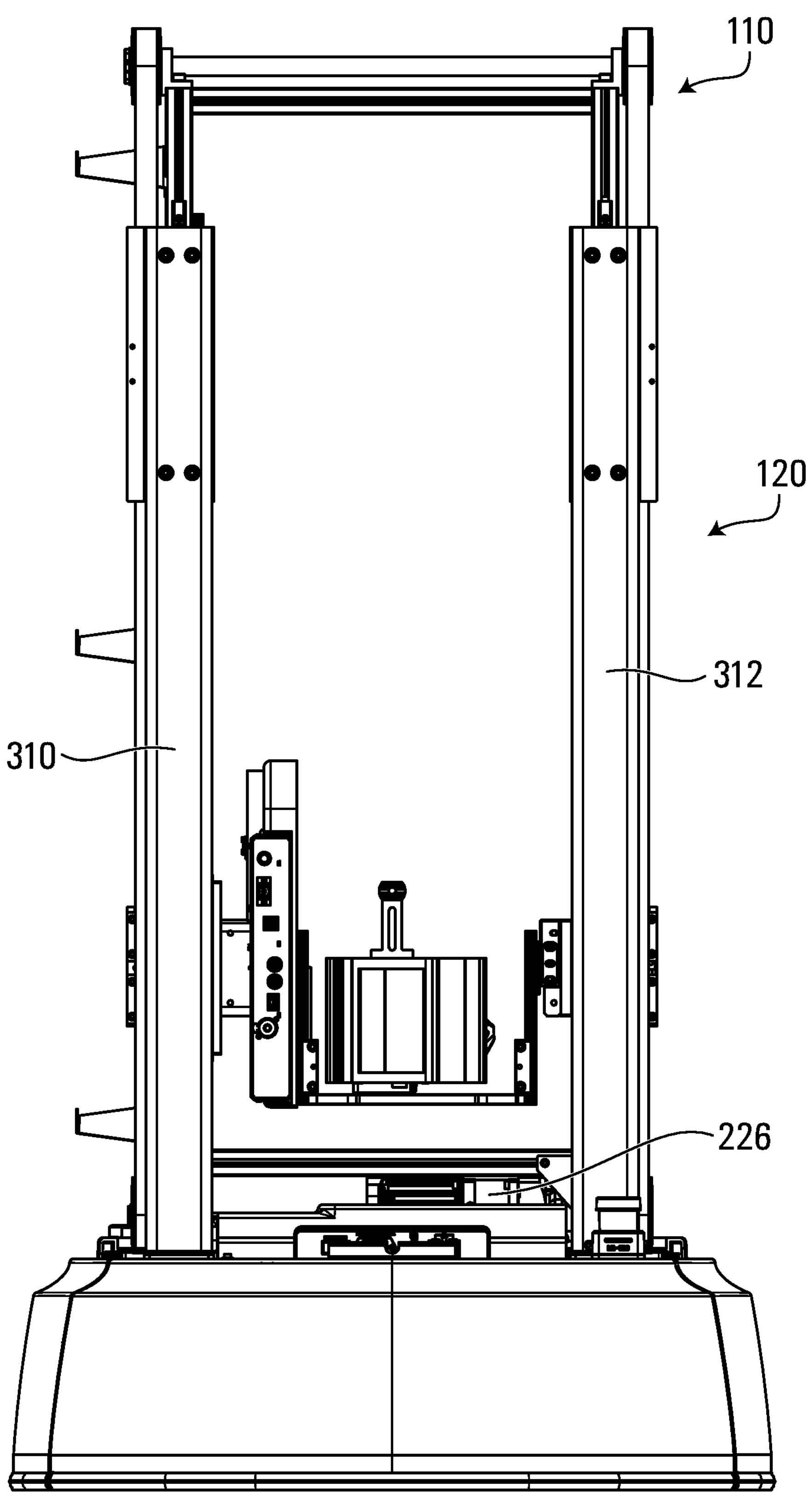
FIG. 3 is a rear plan view of the example video equipment platform in FIG. 1.
Figure 4:
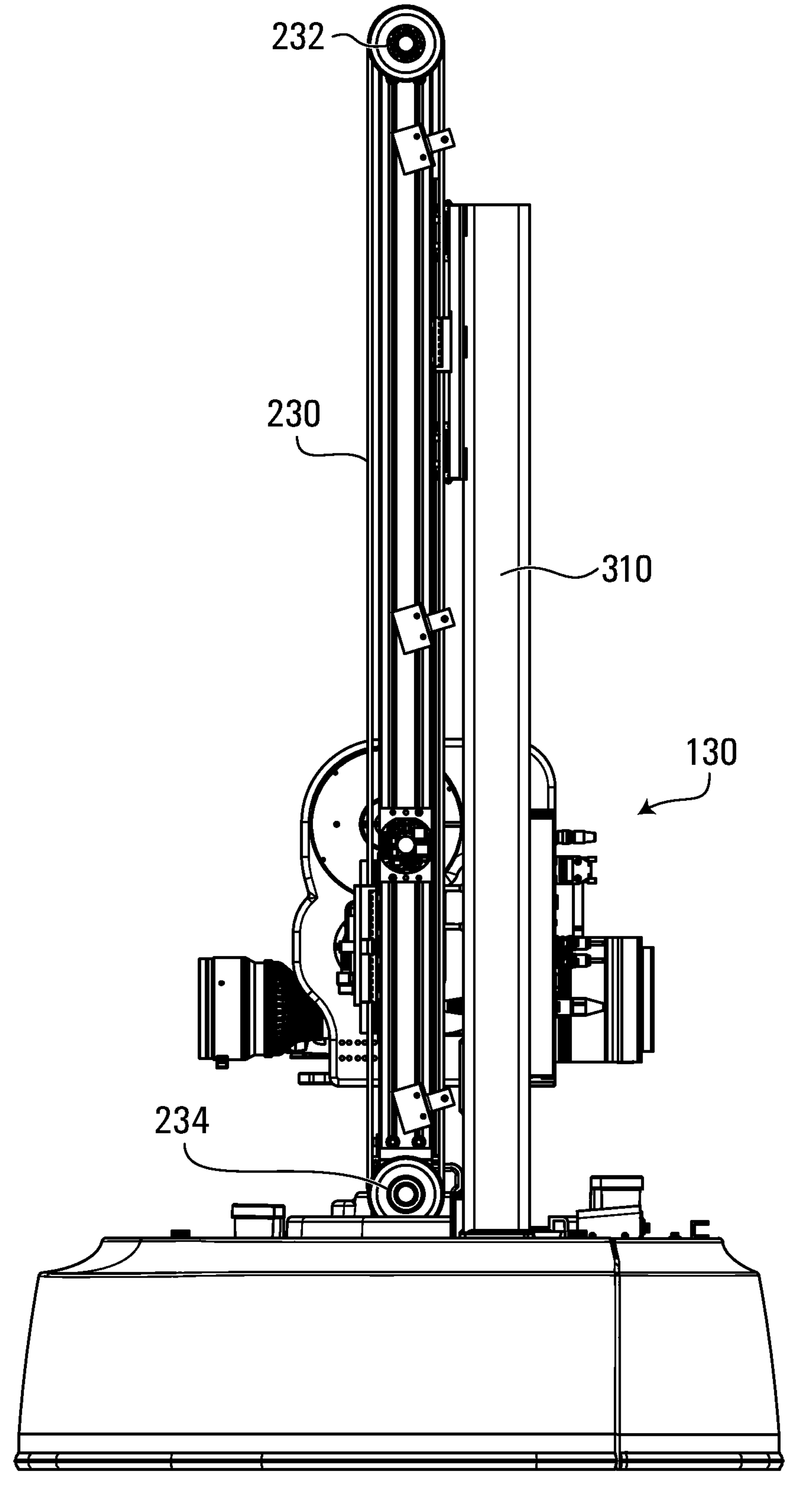
FIG. 4 is a side plan view of the example video equipment platform in FIG. 1, from the right side in the view shown in FIG. 2.
Figure 5:
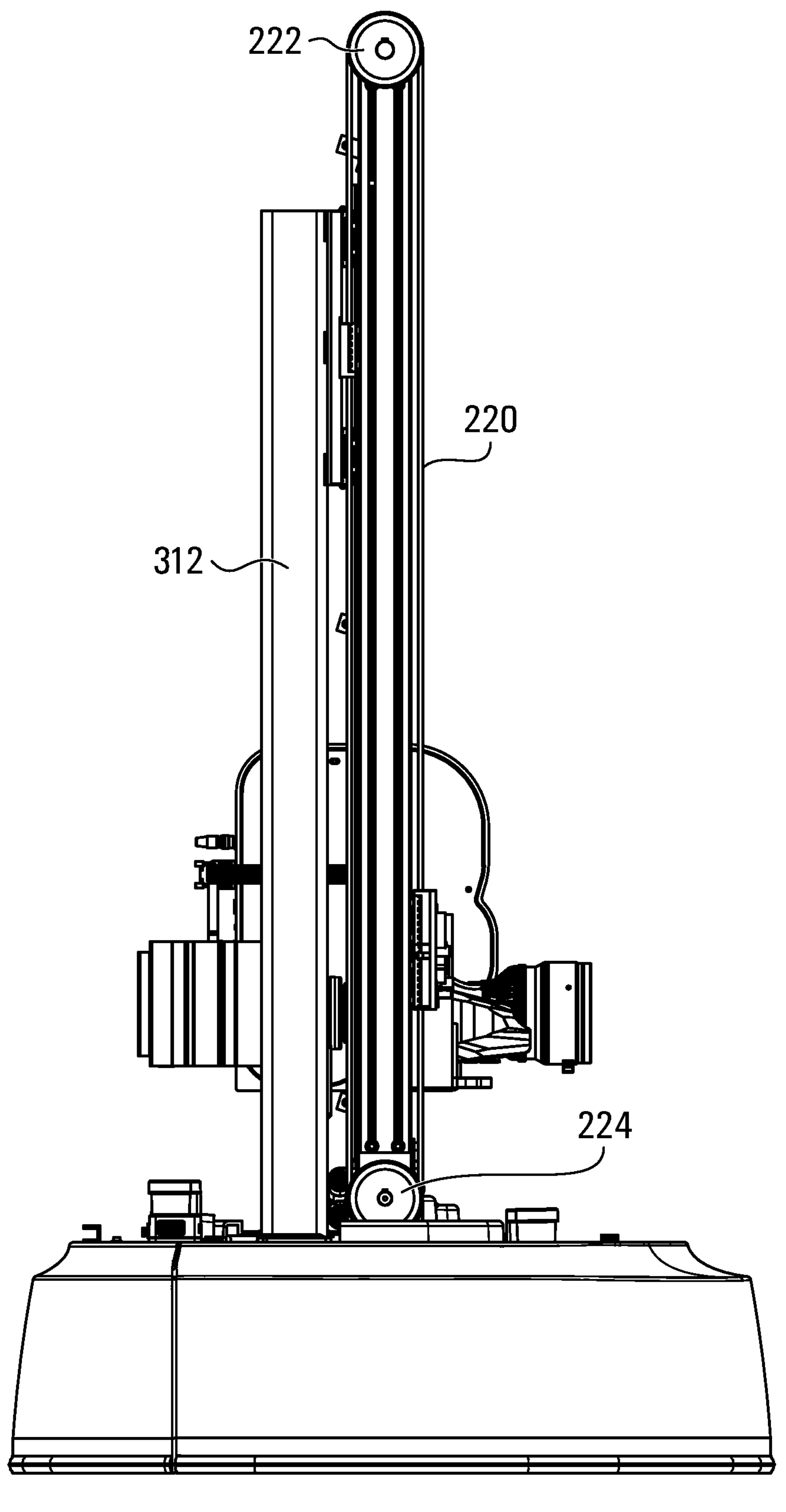
FIG. 5 is a side plan view of the example video equipment platform in FIG. 1, from the left side in the view shown in FIG. 2.

The coupling elements 237, 239 shown in in FIG. 2 couple the axle 236 to the movable frame 110, and may be brackets in the case of a fixed axle 236, or may be or include bearings if the axle 236 is to be rotatable relative to the movable frame 110. In the example shown, each of the coupling elements 237, 239 is coupled to the end of a respective one of the linear side rails 210, 212, but the axle may also or instead be coupled to the linear end rail 214 in other embodiments, by one or more coupling elements.

Similar or different coupling elements may be used to couple the drive pulley axle to the movable frame 110, at the other end of each of the linear side rails 210, 212.

The idler pulley axle 236 and the drive pulley axle are outside the movable frame 110 in the example shown. In other embodiments, one or both of these axles may be coupled to the movable frame differently than shown. For example, the idler pulley axle 236 may instead extend through the linear end rail 214 to reduce vertical height of a video equipment platform. The drive pulley axle may also or instead extend through the linear end rail 216.

In other embodiments, drive pulleys and/or idler pulleys may be individually coupled to the movable frame 110 without a common axle. Pulleys may be mounted to the linear side rails 210, 212 and/or the linear end rails 214, 216, inside or outside the movable frame, for example.

A drive system may include one or more belts extending between a belt drive and a belt idler. In the example video equipment platform 100, the drive system includes a belt 220, 230 at each side of the movable frame 110, extending between a belt drive at the bottom of the movable frame and a belt idler at the top of the movable frame. With reference to FIG. 2, for example, the belt 220 extends between one of the drive pulleys 224 at the first (bottom) end and one of the idler pulleys 222 at the second (top) end of one of the linear side rails 210 of the movable frame 110. A second belt 230 extends between one of the drive pulleys 234 at the first end and one of the idler pulleys 232 at the second end of the other of the linear side rails 212 of the movable frame 110.

Each belt 220, 230 is coupled to the video equipment cradle 130, via respective brackets 242, 244 as shown in FIG. 2, for example, and is also coupled to the support structure 120. Coupling structures by which the belts 220, 230 may be coupled to the video equipment cradle 130 and to the support structure 120 are described by way of example at least below with reference to FIGS. 9 and 10.

The example video equipment platform 100 is illustrative of a two-stage (fixed and movable) platform, with a motor actuated drive belt system moving the second stage with respect to the first. The movable frame 110 is guided up and down the support structure 120 by means of interconnected linear rails 210, 312 and 212, 310, by the drive motor 226 mounted to the movable frame 110, and a synchronous drive belt system includes two belts 220, 230, each coupled to the support structure at a respective single point or location.

Video equipment is an example of a payload that is mounted to or otherwise carried by a cradle 130, which is itself coupled to the same drive belt system, at a single location or part on each belt 220, 230 in the example shown. The video equipment cradle 130, and accordingly the video equipment that is carried by the cradle, are guided up and down the linear side rails 210, 212 of the movable frame 110.

Figure 6:
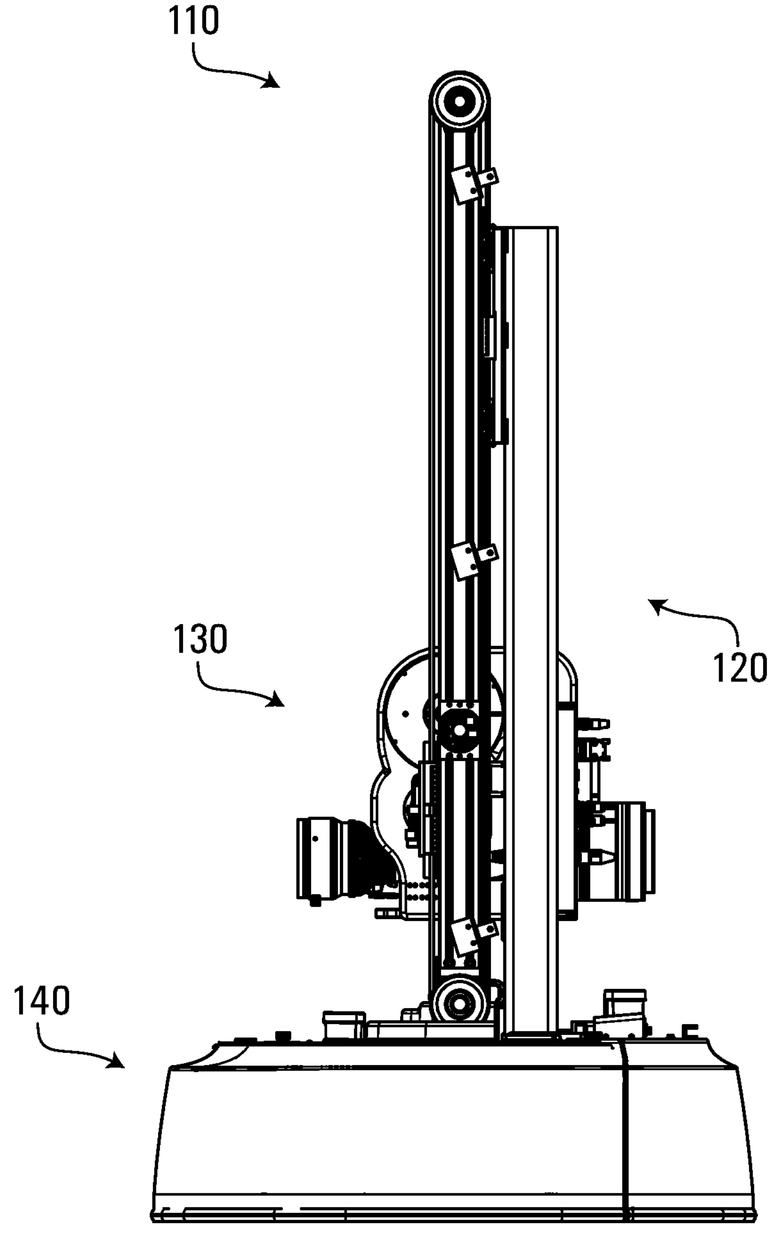
FIG. 6 is a side plan view of the example video equipment platform similar to the view in FIG. 4, with a movable frame and a video equipment cradle at lowest positions.
Figure 7:
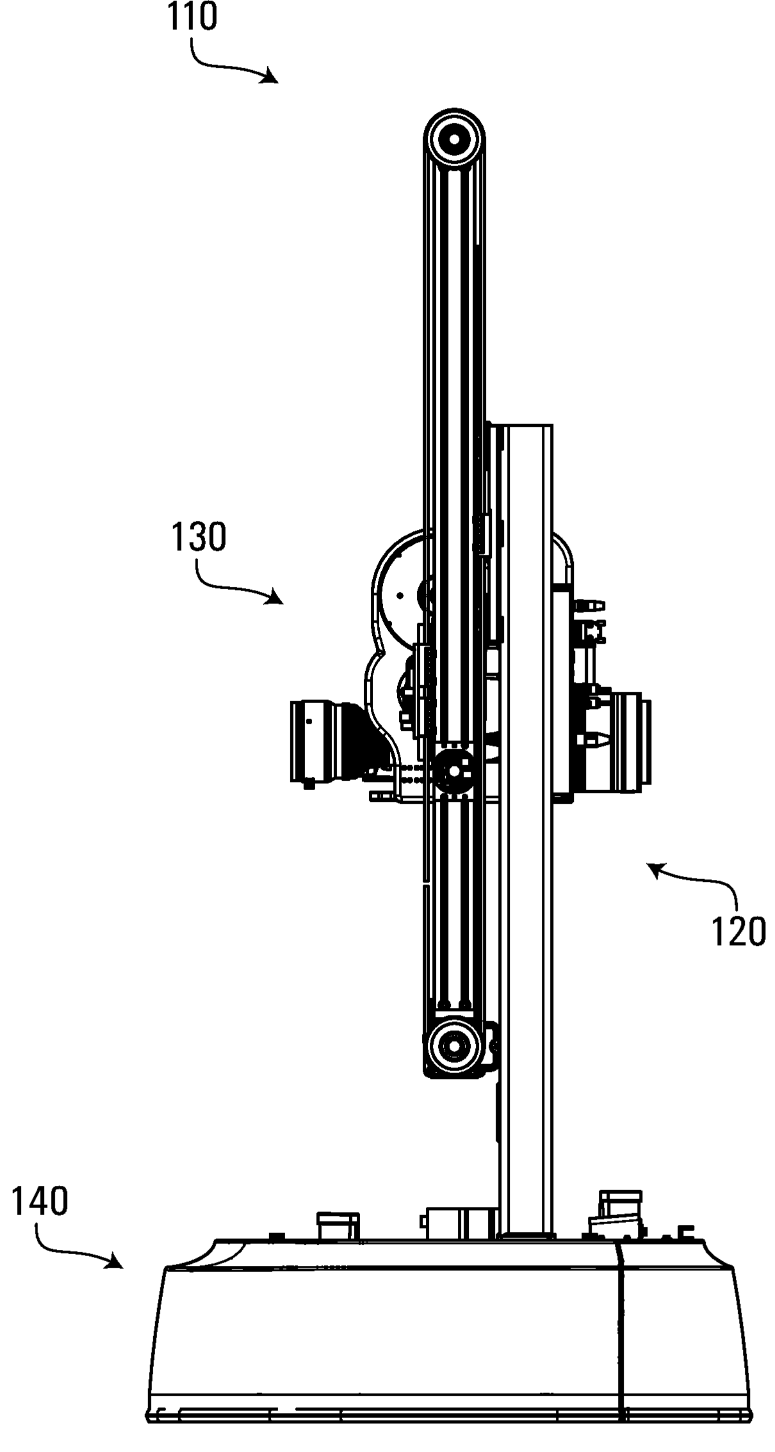
FIG. 7 is a side plan view of the example video equipment platform similar to the view in FIG. 6, with the movable frame and the video equipment cradle at intermediate positions between the lowest positions and highest positions.
Figure 8:
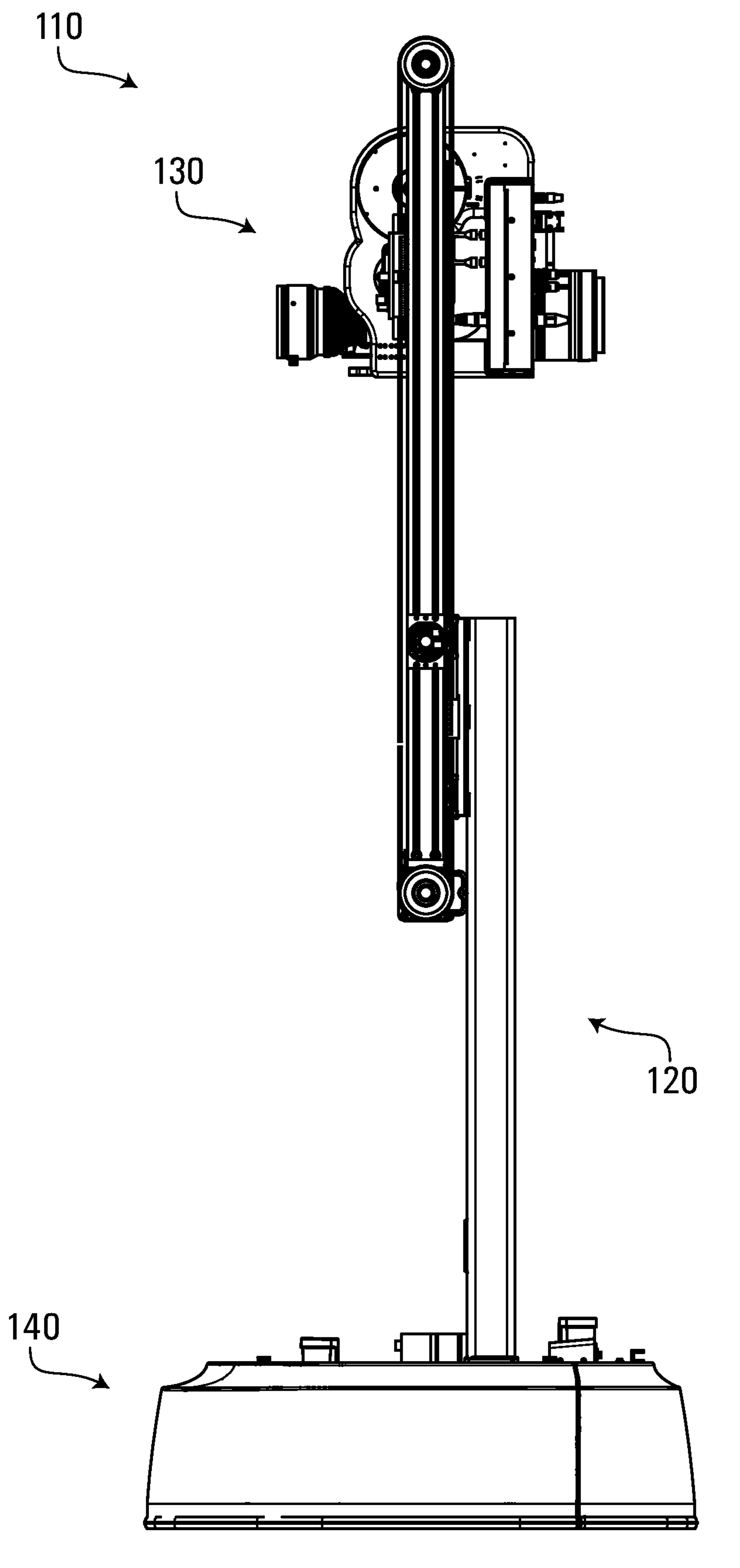
FIG. 8 is a side plan view of the example video equipment platform similar to the views in FIGS. 6 and 7, with the movable frame and the video equipment cradle at the highest positions.

The video equipment cradle 130 and the video equipment that is carried by the cradle will be at lowest positions toward the bottom of the movable frame 110 when the movable frame it is at its lowest position with respect to the support structure 120, as shown by way of example in FIG. 6. The lowest positions of the video equipment cradle 130 and the video equipment may be described as the movable frame 110 being retracted. The video equipment cradle 130 and the video equipment that is carried by the cradle will be at highest potions toward the top of the movable frame 110 when the movable frame is at its highest possible point with respect to the support structure 120, as shown by way of example in FIG. 8. The highest positions of the video equipment cradle 130 and the video equipment may be described as the movable frame 110 being fully extended and the movable frame, the video equipment cradle, and the video equipment having reached their respective highest positions. The video equipment cradle 130 and the video equipment that is carried by the cradle will be at intermediate positions between the top and bottom of the movable frame 110 when the movable frame is at an intermediate position with respect to the support structure 120, as shown by way of example in FIG. 7.

With each belt 220, 230 coupled to the video equipment cradle 130 and the support structure 120 as shown, the video equipment cradle and the video equipment that is carried by the cradle will move vertically with respect to the support structure at twice the rate of movement of the movable frame 110. The rate of movement of the video equipment cradle 130 and the video equipment that is carried by the cradle is also twice the rate at which the belts 220, 230 are driven. Driving each belt 220, 230 at a drive rate moves the movable frame 110 relative to the support structure 120 at the drive rate, and also moves the video equipment cradle 130 and the video equipment that it carries relative to the movable structure at the drive rate. Therefore, the rate of movement of the video equipment cradle 130 and the video equipment that is carried by the cradle relative to the support structure 120 is twice the drive rate.

Such a belt drive system provides for smooth motion in a range between lowest positions and highest positions of the movable frame 110, the video equipment cradle 130, and the video equipment, driven from one drive motor or other actuator.

The example video equipment platform 100 and its operation are described generally by way of example above. Other features that may be provided in embodiments are described in further detail below.

Figure 9:
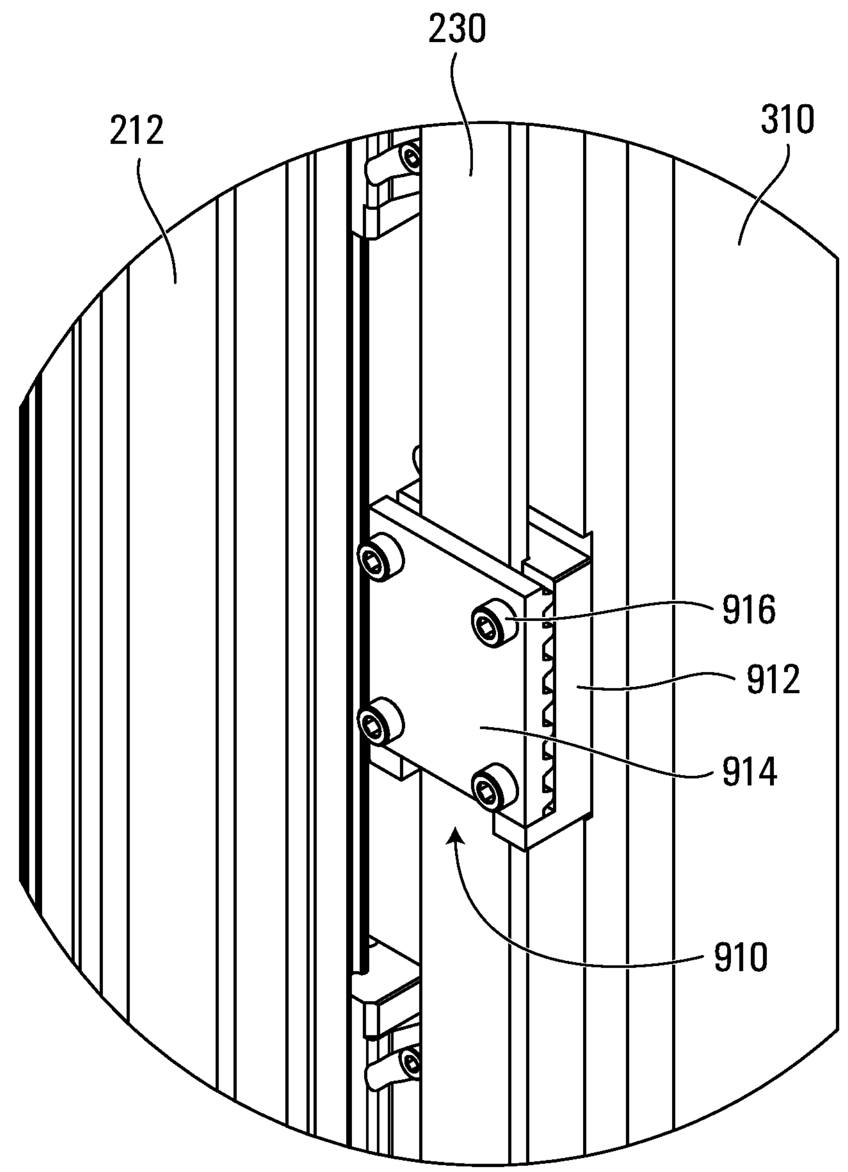
FIG. 9 is an assembled view of an example belt clamp according to another embodiment.
Figure 10:
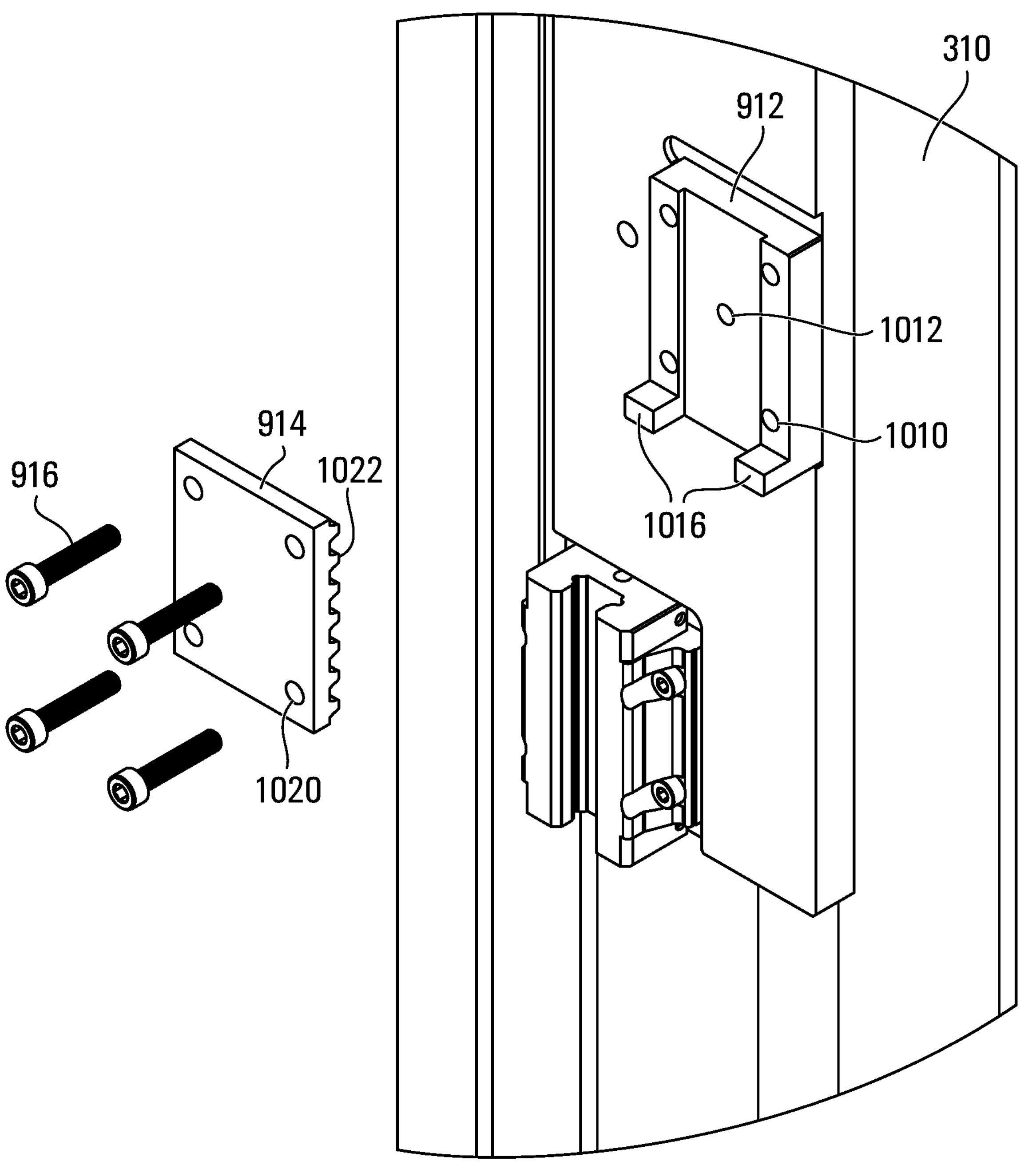
FIG. 10 is an exploded view of the example belt clamp in FIG. 9.

Each of the belts 220, 230 may be coupled to the video equipment cradle 130 and to the support structure 120, and in some embodiments respective belt clamps couple each belt to these components. FIG. 9 is an assembled view of an example belt clamp, and FIG. 10 is an exploded view of the example belt clamp in FIG. 9. The example belt clamp 910 is shown in FIG. 9 as coupling the belt 230 to the linear side rail 310 of the support structure. A belt clamp that is the same as or substantially similar to the example belt clamp 910 may also or instead couple the belt 220 to the other side rail 312 of the support structure 120 shown in FIGS. 1-8. Such a belt clamp may also or instead couple a belt, such as each of the belts 220, 230 for example, to a video equipment cradle.

With reference first to FIG. 9, the example belt clamp 910 (also labelled in FIG. 2) includes multiple parts 912, 914 that are coupled together by fasteners 916 to clamp and hold the belt 230. The belt clamp 910 is coupled to the linear side rail 310, and thus couples the belt 230 to the linear side rail when the parts 912, 914 are coupled together to clamp and hold the belt. Another belt clamp is shown opposite the belt clamp 910 in FIG. 2, to couple the belt 220 to the linear side rail 312.

The exploded view in FIG. 10 illustrates how the belt clamp parts 912, 914 may be coupled together to hold the belt 230, or decoupled to release the belt. In order to provide a clear view of the part 912, the belt is not shown in FIG. 10.

The part 912 may be referred to, for example, as a bracket, a mounting plate, or backing plate. The fasteners 916 may be received in and pass through the bores 1010 in the part 912 to couple the part 912 to the linear side rail 310. In an embodiment, the fasteners 916 are threaded fasteners that pass through the bores 1010 and are received in aligned threaded bores in the linear side rail 310. A separate fastener (not shown) may also or instead be used to couple the part 912 to the linear side rail 310 through the bore 1012, so that the part 912 remains coupled to the linear side rail when the part 914 is separated or entirely detached from the part 912.

The part 914 may be referred to, for example, as a clamping plate. The fasteners 916 pass through bores 1020 in the part 914 to couple the part 914 to the part 912 or to the linear side rail 310. For example, the fasteners 916 may be threaded fasteners that pass through the bores 1020 and are received in threaded bores 1010 in the part 912, and the part 912 is separately coupled to the linear side rail 310. In another embodiment, the fasteners 916 are threaded fasteners that pass through the bores 1020 and 1010 and are received in aligned threaded bores in the linear side rail 310. Tightening the fasteners 916 increases clamping force on the belt 230, and thus increases holding power to avoid slippage of the belt. Loosening the fasteners 916 decreases clamping force to provide for belt adjustment or removal of the part 914 for belt installation, removal, and replacement for example.

A belt may have smooth surfaces as shown in FIG. 9, or profiled surfaces. A common form of belt, for example, has a profiled drive surface with belt teeth that are to engage pulley teeth on a drive pulley. Idler pulleys may or may not also have pulley teeth. A belt clamp may also have a profiled surface as shown by way of example at 1022, with teeth to engage belt teeth and improve holding power to resist belt slippage. With reference also to FIG. 9, the surface of the belt 230 that faces the part 914 may be a profiled surface with belt teeth to engage teeth on a drive pulley, and in that case the teeth of the profiled surface 1022 engage the belt teeth when the belt clamp 910 is assembled.

A toothed belt, or more generally a belt with a profiled surface, may be beneficial to reduce drive slippage during driving by a drive pulley that has a corresponding profiled drive surface, and also to reduce slippage at coupling locations or parts at which the belt is coupled to a support structure and a video equipment cradle. However, in other embodiments friction between smooth belt surfaces and smooth surfaces on drive pulleys and belt clamps may be sufficient for driving and/or holding a belt. Although it is expected that belts and at least drive pulleys with profiled surfaces will be preferred in most applications, it is possible that belts and drive pulleys with smooth surfaces may be used in some embodiments.

Belt clamps may or may not have parts with profiled surfaces. For example, it is expected that a part 914 with a profiled surface such as 1022 matching a profiled surface of a belt will be preferred for improved holding power in embodiments that include a belt with a profiled surface. However, a part such as 914 with a profiled surface 1022 may provide improved holding power relative to a non-profiled part even in conjunction with a belt that has a smooth surface. In such embodiments, teeth or other structures of the profiled surface may compress parts of the smooth belt surface to improve holding power. Similarly, it is possible that part 914 with a smooth surface instead of the profiled surface 1022 may be used in conjunction with a belt that has a profiled surface, in which case teeth or other structures of the profiled belt surface may be compressed by the smooth surface of the belt clamp part.

The structures 1016 may be provided in some embodiments, and may be referred to as extensions or stops, for example. These extensions 1016 may be useful, for example, in properly locating the part 914 relative to the part 912 during assembly of the belt clamp 910, and/or in properly locating a belt relative to the part 912. The extensions 1016 may also provide additional structural support for the part 914 during operation of a video equipment platform, when a belt is driven to extend the movable frame relative to the support structure in the example shown. Such extensions may also or instead be provided at the opposite end of the part 912, and/or on the part 914.

A belt clamp is one example of a component that may be used in some embodiments to couple a belt to another part of a video equipment platform. The present disclosure is not in any way limited to a multi-part structure, or any other form, of a belt clamp. In other embodiments, a belt may be attached to one or more other part of a video equipment platform without using a belt clamp.

Figure 11:
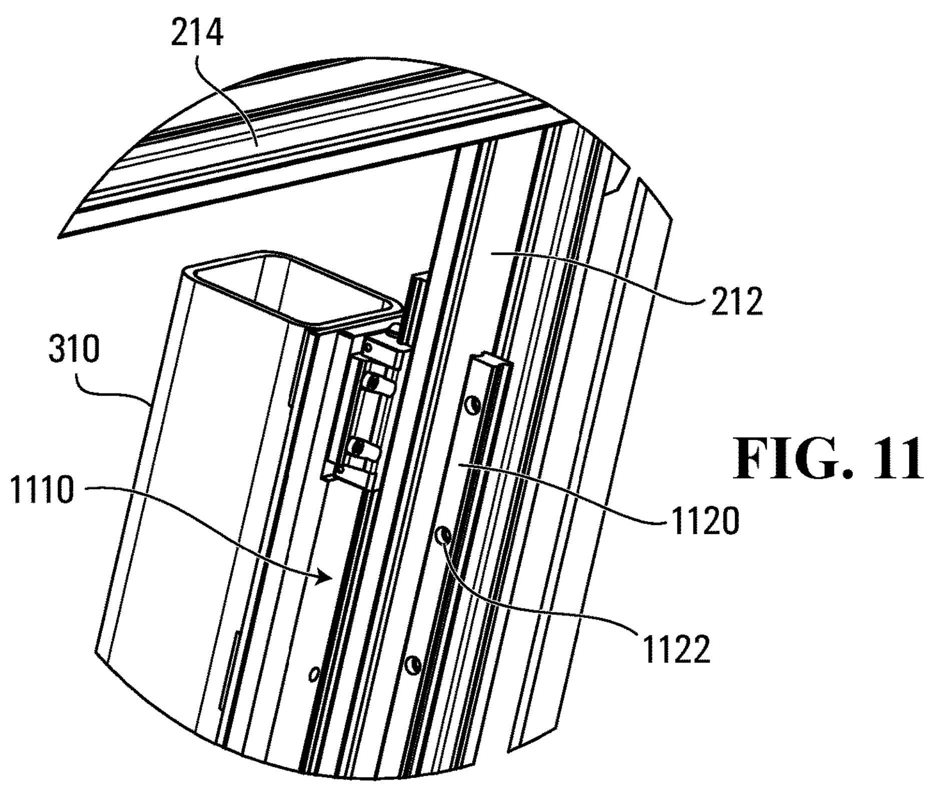
FIGS. 11 and 12 are isometric views of an example coupling structure according to a further embodiment.
Figure 12:
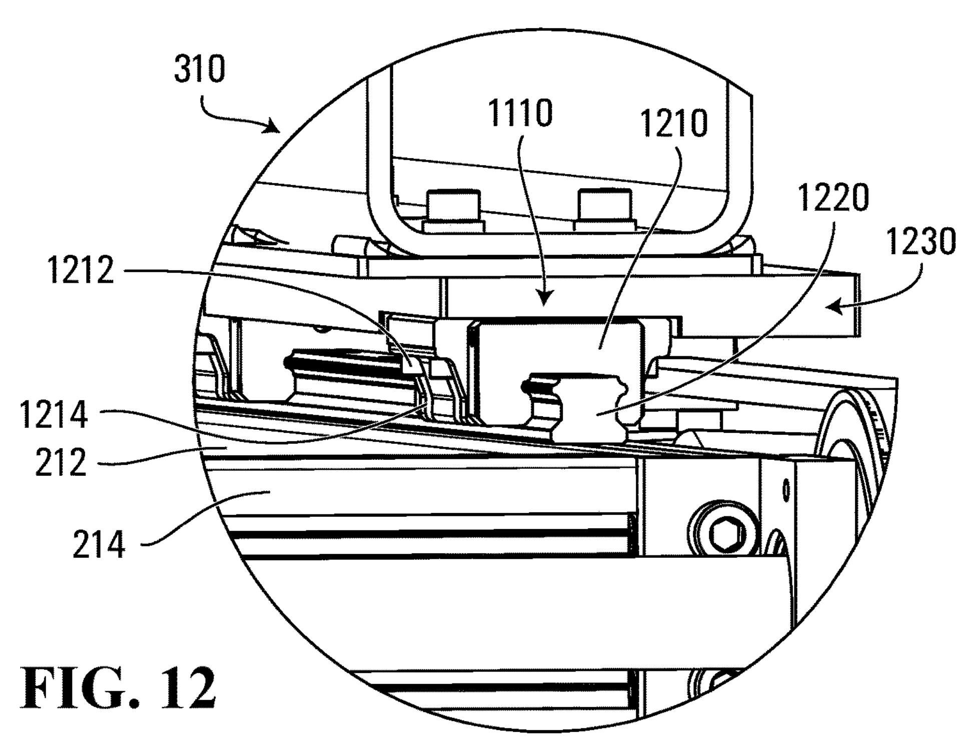
Figure 13:
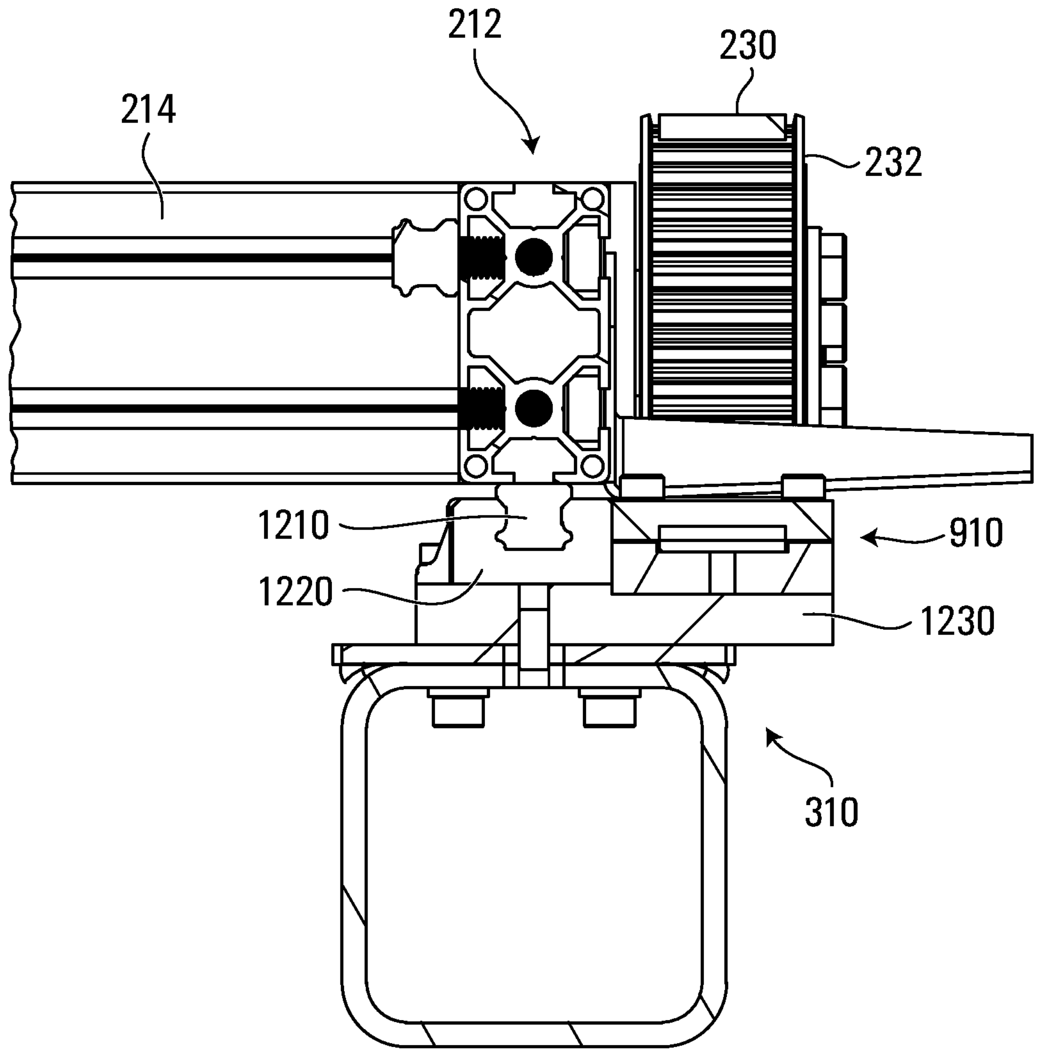
FIG. 13 is a bottom cross-sectional view of the example coupling structure shown in FIGS. 11 and 12.

As described at least above, the movable frame 110 is coupled to the support structure 120. For example, the linear side rails 210, 212 of the movable frame 110 and 310, 312 of the support structure 120 as shown in FIGS. 1 to 8 may be coupled together, and an example coupling structure for coupling side rails to each other is shown in FIGS. 11 to 13. FIGS. 11 and 12 are isometric views of an example coupling structure, and FIG. 13 is a bottom cross-sectional view of the example coupling structure shown in FIGS. 11 and 12.

A coupling structure, which may also be referred to as a coupler for example, is shown generally at 1110 in FIG. 11, and is also labelled in FIG. 2. The coupling structure 1110 couples the linear side rail 310 of the support structure to the linear side rail 212 of the movable frame. Although only one coupling structure 1110 is shown in FIGS. 11 to 13 and labelled in FIG. 2, multiple coupling structures may be provided. For example, a respective coupling structure may couple each of the linear side rails 312, 310 of the support structure to a respective one of the linear side rails 210, 212 of the movable frame.

More than one coupling structure may be provided to couple the same pair of linear side rails together in some embodiments, to improve stability. As shown in FIG. 2, for example, there is another coupling structure below the labelled coupling structure 1110, and two coupling structures at the other side of the example video equipment platform 100 to couple the linear side rails 210, 312 together. In this example, coupling structures are provided at heights above and below the locations at which each belt 220, 230 is coupled to the support structure 120. During operation of the video equipment platform 100, driving the belts 220, 230 to raise or lower the movable frame 110 and the video equipment cradle 130 may tend to rotate the movable frame relative to the support structure 120, and multiple coupling structures above and below the belt clamps that coupled each belt to the support structure help counteract such rotation for smoother operation and movement of video equipment.

The example coupling structure 1110 includes a carriage 1210 and a guide rail 1220. A carriage may be referred to as a slide or a slider, and a guide rail may be referred to as a guide, for example. In the example shown, the carriage 1210 is coupled to the support structure linear side rail 310, by fasteners 1212, and the guide rail 1220 is coupled to the movable side frame linear side rail 212. The guide rail 1220 may be coupled to the linear side rail 212 by fasteners, which are not visible in FIGS. 11 to 13, but may be the same as or substantially as shown at 1122 for the cradle guide rail 1120. In FIG. 12, 1214 denotes cutouts in a body of the carriage 1210 to accommodate the fasteners 1212 during installation and removal. Such cutouts may or may not be provided in other embodiments, where a carriage has a different shape or otherwise does not require such features to accommodate fasteners for example.

More generally, a first component (one of the carriage 1210 or the guide rail 1220, for example) may be coupled to a respective one of the linear side rails of the support structure, and a second component (the other of the carriage 1210 or the guide rail 1220) may be coupled to a respective one of the linear side rails of the movable frame. In this general example, one of the first component and the second component is received and retained within the other of the first component and the second component to couple the respective one of the linear side rails of the support structure to the respective one of the linear side rails of the movable frame, and is slidable within the other of the first component and the second component to enable the movable frame to move relative to the support structure. This is illustrated by way of example in FIGS. 11 to 13, in which the guide rail 1220 is received and retained within the carriage 1210 to couple the linear side rail 310 of the support structure to the linear side rail 212 of the movable frame, and is slidable within the carriage 1210 to enable the movable frame to move relative to the support structure.

A coupling structure should remain engaged to couple the movable frame and the support structure together throughout the full range of movement of the movable frame. In the example shown in FIGS. 11 to 13, the carriage 1210 should remain engaged with the guide rail 1220 throughout the full range of movement of the movable frame, and accordingly the guide rail is of a length of at least the range of movement of the movable frame plus a dimension of the carriage along the direction of movement. In the case of multiple carriages, there may be multiple corresponding guide rails of that length. A single guide rail may be provided in such an embodiment, with a length of at least the range of movement of the movable frame, plus a dimension of each carriage along the direction of movement, plus a distance between the carriages along the direction of movement.

Linear rails may be directly or indirectly coupled to each other. FIG. 12 illustrates an embodiment in which the coupling structure 1110 is indirectly coupled to the linear side rail 310. In FIG. 12, 1230 designates an element that may be referred to as a spacer or adapter, for example, that is coupled to the linear side rail 310 and to the carriage 1210. The spacer 1230 is an example of an intermediate element by which elements may be indirectly coupled to each other. In the example shown, the coupling structure 1110 is indirectly coupled to the linear side rail 310. However, this type of indirect coupling may also or instead be used to couple other elements together.

FIG. 13 illustrates a possible application of such an intermediate element, to accommodate different sizes of coupled elements, which are a coupling structure (including elements 1210, 1220) and the belt clamp 910. An intermediate element may also or instead be used to provide spacing between coupled elements such as the linear side rail 310 and the linear side rail 212.

A video equipment cradle is described generally above as carrying video equipment. An example of such a cradle is described in more detail below with reference to FIGS. 14 to 17, which are isometric views and a front plan view of such a cradle.

Figure 14:
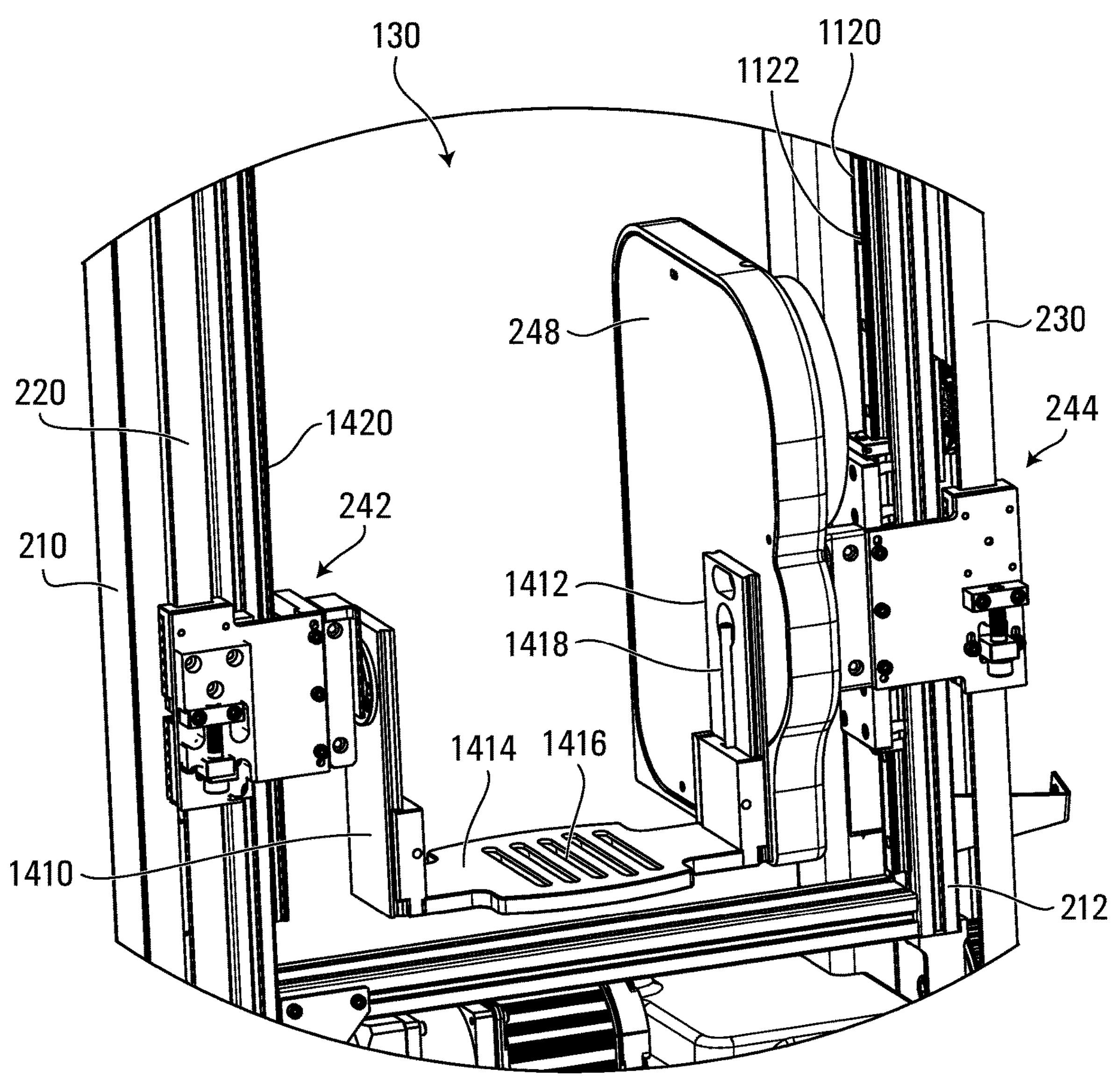
FIGS. 14 to 16 are isometric views of an example video equipment cradle according to a further embodiment.
Figure 16:
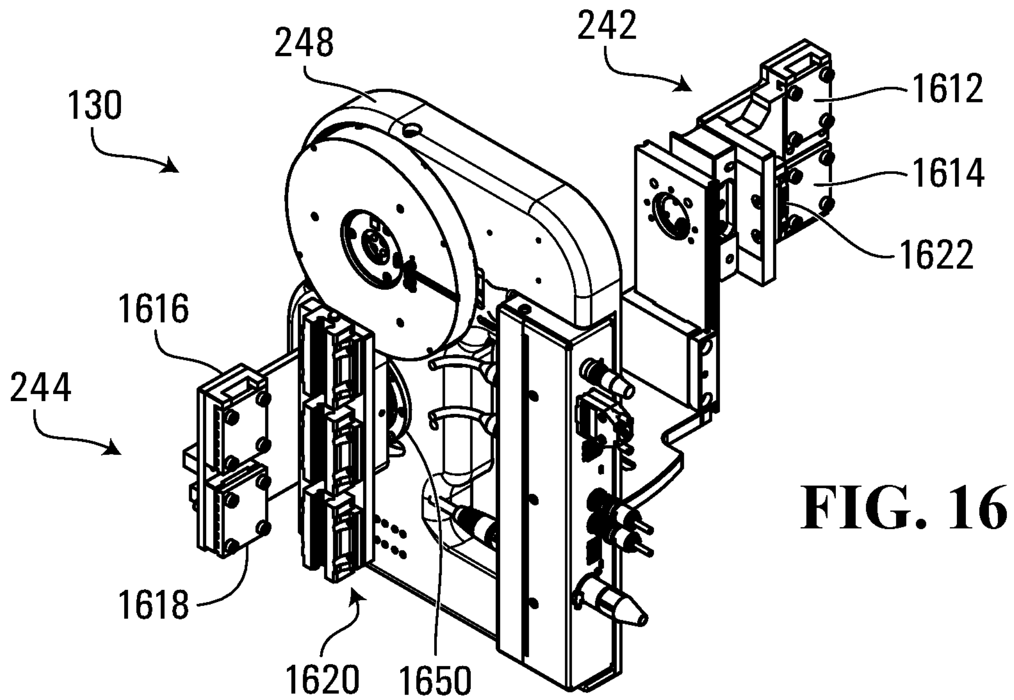

FIG. 14 provides a larger scale view of how each belt 220, 230 is coupled to the video equipment cradle 130 via respective brackets 242, 244. Each bracket 242, 244 may include one or more belt clamps, and as shown in FIG. 16 each bracket includes two belt clamps 1612, 1614, and 1616, 1618. These belt clamps 1612, 1614, 1616, 1618 are substantially the same as the example belt clamp shown in FIGS. 9 and 10, except that each belt clamp is part of a video equipment cradle bracket 242, 244 instead of being coupled to a linear side rail of the support structure. Belt clamp features that are described elsewhere herein may also or instead be implemented in one or more video equipment cradle brackets 242, 244.

The video equipment cradle brackets 242, 244 may be substantially identical to each other. In the example shown, however, the bracket 242 is coupled to a side member 1410 (also labelled 246 in FIG. 2), whereas the bracket 244 is coupled to an optional tilt system 248 that is in turn coupled to an opposite side member 1412 of the video equipment cradle 130. In other embodiments, identical brackets are coupled to respective side members 1410, 1412. The example video equipment cradle 130 also includes a bottom member or mounting member 1414, that is coupled to the side members 1410, 1412, and to which video equipment may be mounted or otherwise coupled. In FIG. 14, 1416 generally represents slots in the bottom member 1414, which may be provided for air circulation to facilitate air cooling of the video equipment and/or for fasteners by which the video equipment or a video equipment mount may be attached to the bottom member.

A video equipment cradle guide rail 1120 coupled to the linear side rail 212 of the movable frame is shown in FIG. 11 and is also labelled in FIG. 14. Another video equipment cradle guide rail 1420, which may similarly be coupled to the opposite linear side rail 210 of the movable frame, is also shown in FIG. 14. These guide rails 1420, 1120 are parts of respective coupling structures that couple the video equipment cradle brackets 242, 244, and thus the video equipment cradle 130, to the linear side rails 210, 212 of the movable frame. This is one example of how a video equipment cradle may be coupled to each of the linear side rails of the movable frame. As shown most clearly in FIG. 16, each bracket includes one (at 1622, for example) or more (at 1620, for example) carriages that slide along the cradle guide rails 1420 and 1120, respectively, as the video equipment cradle 130 moves upward and downward. In the example shown in FIG. 16, the bracket that is coupled to the optional tilt system 248 includes three carriages 1620, to provide additional vertical stability for the video equipment cradle 130 and help resist rotation of the cradle as a result of any weight imbalance of the tilt system relative to the bracket 244 and/or during tilting of the cradle. Although multiple carriages 1620 are shown in FIG. 16, a similar effect may be provided by fewer carriages, or a longer single carriage.

Features that are described elsewhere herein for linear side rail coupling structures may also or instead be implemented in one or more coupling structures to couple a video equipment cradle to a movable frame. For example, a cradle/movable frame coupling structure may include a first component (a carriage or a guide rail, for example) coupled to one of the movable frame or the video equipment cradle, and a second component (the other of the carriage or the guide rail) coupled to the other of the movable frame and the video equipment cradle, and the first and second components may be consistent with the general example above, in which one of the components is received and retained within and is slidable within the other. In the case of a guide rail and carriage coupling structure, a guide rail is received and retained within a carriage, to couple a video equipment cradle to a linear side rail of the movable frame in the case of a cradle/movable frame coupling structure, and is slidable within the carriage to enable the video equipment cradle and thus the video equipment to move relative to the movable frame.

A cradle/movable frame coupling structure should remain engaged to couple the cradle and the movable frame together throughout the full range of movement of the cradle. The cradle guide rails 1120, 1420 may be of the same length or different lengths. Each cradle guide rail should have a length of at least the range of movement of the cradle plus a dimension of the respective carriage(s) along the direction of movement.

The tilt system 248 is an example of an optional component that may be provided in some embodiments. An equipment mount that is carried by a video equipment cradle, for example, may provide features such as tilt and/or pan independently of the video equipment cradle, and therefore the tilt system 248 might not be provided in some embodiments. A tilt system such as the tilt system 248 may, however, potentially provide a greater range of tilt and/or more seamlessly integrated tilt control than a separate equipment mount.

Figure 15:
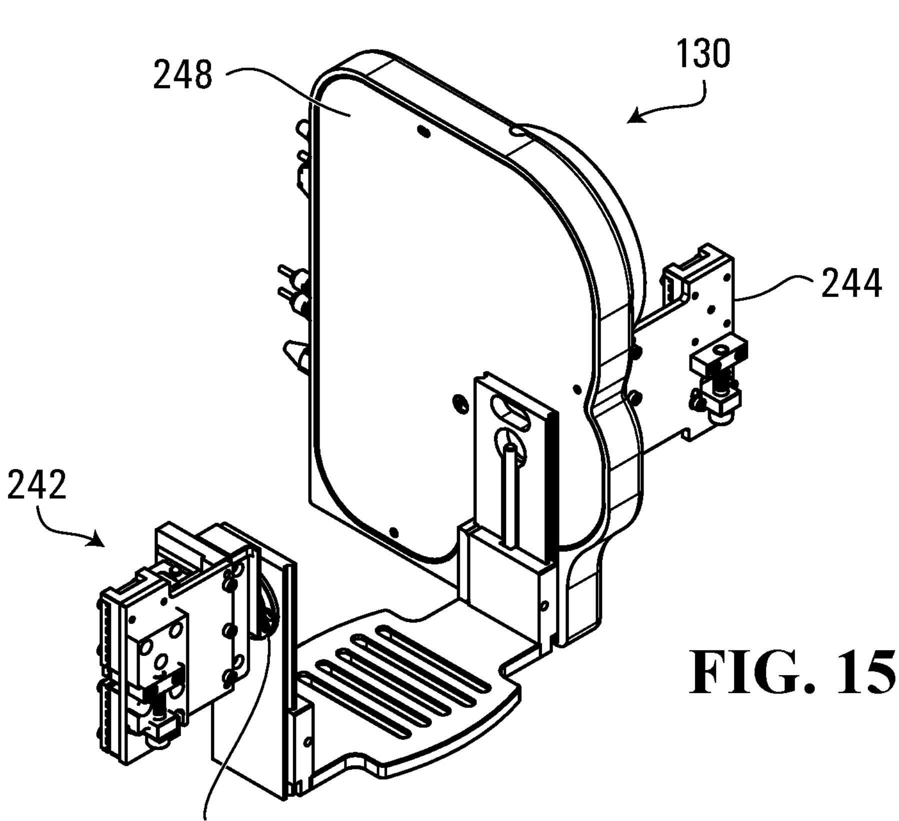
Figure 17:
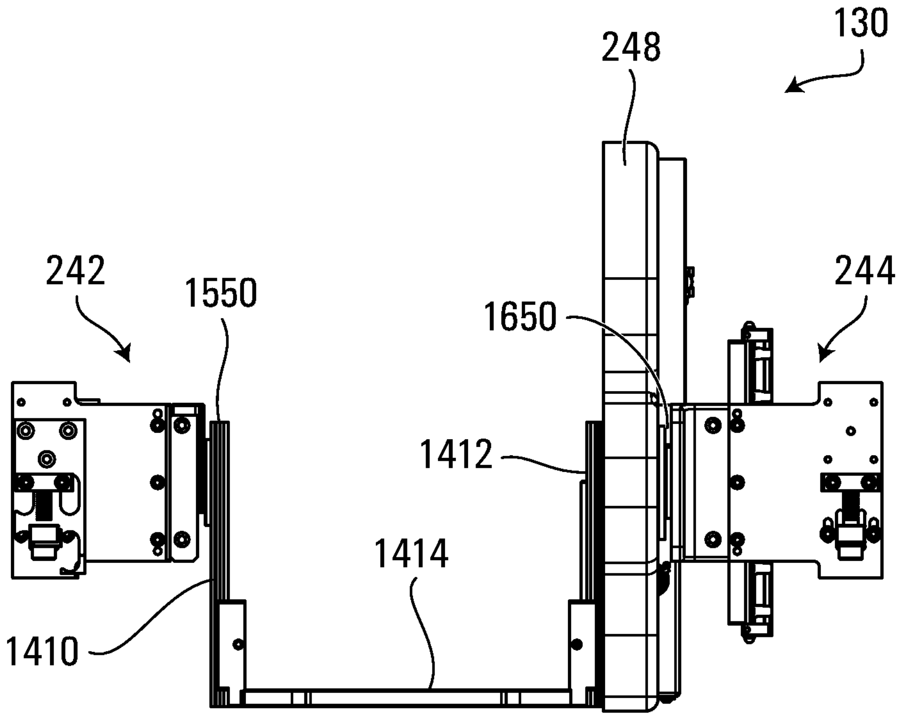
FIG. 17 is a front plan view of the example video equipment cradle shown in FIGS. 14 to 16.

In the embodiment shown in FIGS. 14 to 17, the tilt system 248 is part of the video equipment cradle 130, and may include a further drive system to controllably tilt the video equipment cradle relative to the movable frame. In FIGS. 15 and 17, 1550 designates a rotatable coupling, that may be or include a bearing for example, between the side member 1410 and the bracket 242. Similarly, another rotatable coupling between the tilt system 248 and the bracket 244 is shown at 1650 in FIGS. 16 and 17. The rotatable coupling 1650, in effect, rotatably couples the side member 1412 to the bracket 244. In such an embodiment, the example video equipment cradle 130 is tiltable relative to the movable frame.

Although tilting of the cradle could potentially be driven by the same drive system that drives movement of the movable frame and the video equipment cradle, an independent tilt drive is likely preferable. The tilt system 248 may include a motor and a gear, belt, or other drive assembly, for example, to translate rotation of a rotor of the motor to tilting of the video equipment cradle relative to the brackets 242, 244 and thus relative to the movable frame.

Other features may also or instead be implemented in conjunction with a video equipment cradle. For example, in some embodiments a video equipment cradle may carry multiple pieces of equipment, such as a video camera on the bottom member 1414, and a teleprompter and/or a display screen at a front of the video equipment cradle and out of a line of sight of the video camera so as not to interfere with operation of the video camera. A teleprompter that is carried at a front of the cradle allows on-air talent to read content while facing in the direction of a camera, and similarly a display screen that is carried at a front of the cradle allows on-air talent to read content and/or view video that is being captured by the camera while facing in the direction of a camera.

Another feature that may be provided in some embodiments is a movable bottom member 1414 that is movable relative to the side members 1410, 1412. In FIG. 14, 1418 designates a screw drive that engages part of the bottom member 1414 to move the bottom member upward and downward (in the illustrated view) along the side members 1410, 1412. A movable bottom member 1414 may be useful, for example, to re-center video equipment within the movable frame or re-balance the load of video equipment when the video equipment cradle is tilted.

A video equipment platform may similarly include other features in some embodiments. With reference again to FIG. 1, the description above focuses primarily on features related to the movable frame 110, the support structure 120, and the video equipment cradle 130. FIGS. 1 to 8 also illustrate a base 140 upon which the support structure may be mounted in some embodiments.

Although the base 140 is a movable base in some embodiments, the support structure 120 need not be carried by or otherwise coupled to a movable base. Fixed-base embodiments are also possible. The support structure may be mounted to a structural component such as a wall or a floor, or to a base that is intended to remain fixed during operation of other components of a video equipment platform. A movable base, coupled to the support structure 120 and movable relative to a surface on which the video equipment platform 100 is to be operated, may be preferred for greater versatility and range of motion.

FIG. 2 illustrates an embodiment of the movable base 140, which includes two driven wheels 252, which may be independently driven, and two caster-type wheel sets (one shown at 254 and an opposite identical set, at the rear in the view shown in FIG. 2. The two driven wheels 252 are located at opposite sides of the base 140, and the two caster-type wheel sets 254 are also located at opposite sides of the base, to provide four equally-spaced points of support. Other wheel types, including non-driven wheels and/or wheels sets for a manually repositionable base, are possible. Embodiments with more or fewer wheels or wheel sets are possible as well.

Another feature that may also or instead be provided in some embodiments is a rotatable base mount, which can enable video equipment platform panning. The support structure 120 may be rotatably coupled to a base, such as the movable base 140, and be rotatable relative to the base about an axis of rotation that extends through the base. The rotation in this example is relative to a base that is beneath the movable frame 110. In FIG. 2, 250 designates a rotatable base mount, which may be or include a bearing for example, that supports the support structure 120 and allows the support structure (and the movable frame 110 and the components coupled thereto) to rotate relative to the base 140. Although the base 140 is a movable base, rotation of other components of a video equipment platform relative to a base are not in any way dependent upon a movable base. A rotatable base mount may be implemented in conjunction with a fixed base or a movable base.

Similar to video equipment cradle tilting as described at least above, a rotatable base mount 250 is an optional component that may be provided in some embodiments. An equipment mount that is carried by a video equipment cradle, for example, may provide for panning independently of the video equipment cradle. However, a rotatable mount may provide a greater range of panning. For example, panning on a separate equipment mount is limited due to physical interference and/or shot interference of one or more of the movable frame 110, the support structure 120, and the video equipment cradle 130. With a rotatable base mount such as the example mount 250, the movable frame 110, the support structure 120, and the video equipment cradle 130 pan with the video equipment, avoiding such interference over a greater range of panning.

A further drive system, which may be referred to as a pan drive or panning drive for example, may be provided in the base 140, on the support structure 120, or partially in the base and partially on the support structure, to controllably rotate the support structure relative to the base. Such a drive system may include a drive motor or other actuator, with a suitable coupling such as a gear, belt, or other drive assembly, to translate rotor rotation or actuator motion into rotation of the support structure.

Figure 18:
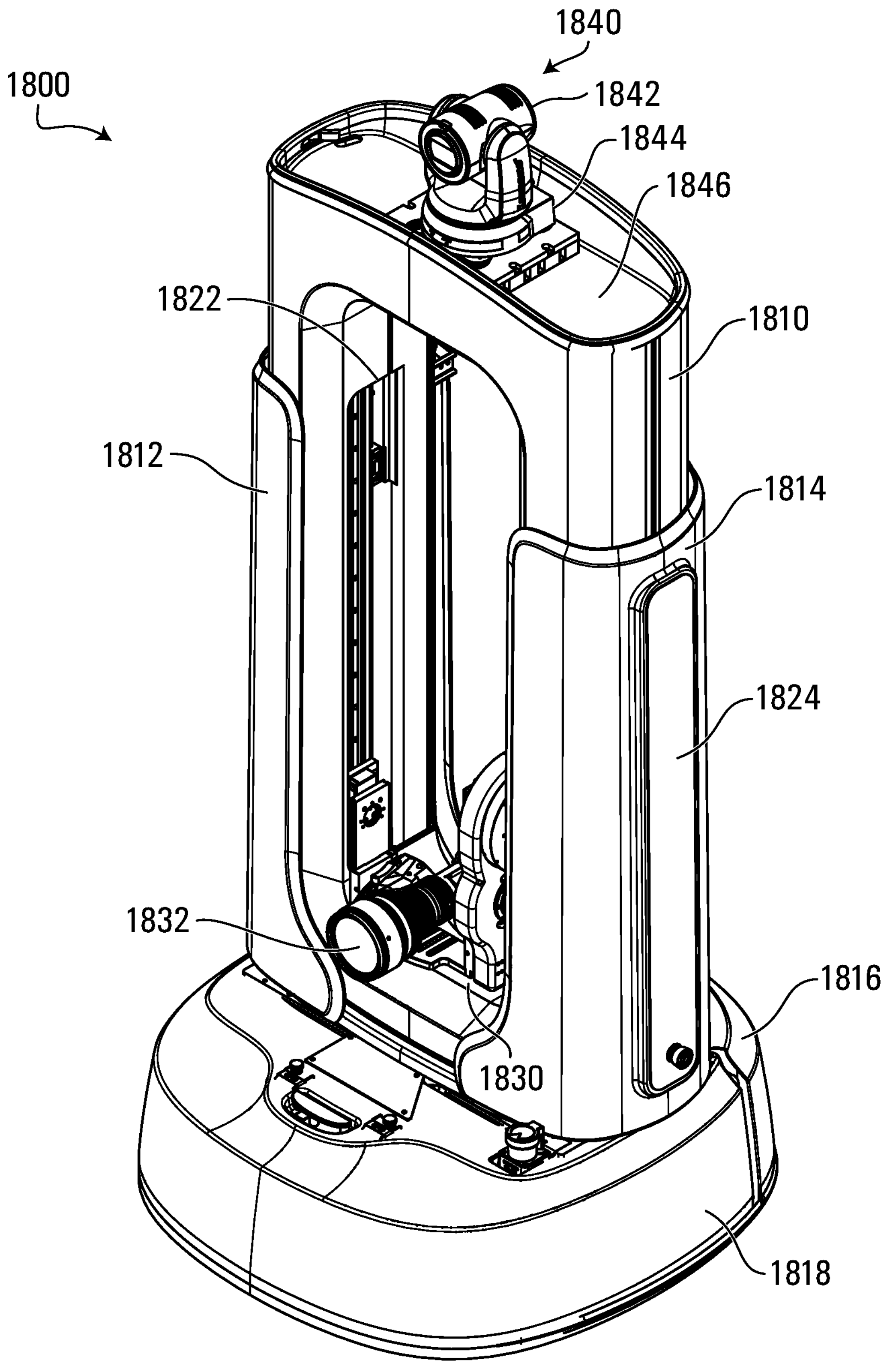
FIG. 18 is an isometric view of another example video equipment platform according to yet another an embodiment, with additional components installed.

FIG. 18 is an isometric view of another example video equipment platform 1800, with additional components installed. The example video equipment platform 1800 may otherwise be the same as or substantially the same as the example video equipment 100 described at least above.

The additional components illustrated in FIG. 18 include a housing, with components 1812, 1814, partially covering the support structure, and a housing 1810 partially covering the movable frame. As shown, the housing 1810 partially covering the movable frame is sized and arranged to be partially received within and move partially within the housing (with components 1812, 1814) that partially covers the support structure. In the view shown in FIG. 18, the housing 1810 is mounted to the movable frame and therefore moves with the movable frame, translating up and down partially within the housing components 1812, 1814, as the movable frame is moved up and down.

A base housing with housing components 1816, 1818 at least partially covers the base.

A housing or housing component may be mounted to a video equipment platform in any of various ways. Brackets 260, 262 are shown in FIG. 2, to provide an example of how the housing 1810 may be mounted to the movable frame 110. Other types of housing mounts or connections are possible, and the present disclosure is not in any way limited to a particular type of housing mount.

In general, parts of a video equipment platform may be at least partially covered by housings or housing components that are sized and arranged so as to avoid interference with movement during operation of the video equipment platform. The housing 1810, for example, is mounted to and movable with the movable frame so that the movable frame can be extended and retracted during operation. The support structure housing, including the housing components 1812, 1814 in the example shown, is mounted to the support structure so that it remains in place covering the support structure but does not impede movement of the movable frame or the video equipment cradle 1830 during operation of the video equipment platform 1800. The base housing, which includes the housing components 1816, 1818, is mounted to the base but does not interfere with rotation of the support structure in the case of a rotatable mount between the base and the support structure, and does not extend all the way to a surface on which the video equipment platform is to operate in the case of a movable base.

Element 1822 is a window or opening in the housing 1810. The window 1822, and a counterpart window opposite the window 1822 at the other side of the housing 1810, allow the video equipment mount 1830 and the camera 1832 to be moved relative to the movable frame during operation.

Housings, housing components, or at least parts thereof, are preferably removable to provide access to internal parts of a video equipment platform. As an example, 1824 in FIG. 18 designates a removable access panel through which the support structure and the movable frame are accessible. Such a panel may also or instead be provided in the housing component 1812, and/or in other housings or housing components. Housings or housing components may also or instead be removable for greater access as needed.

In some embodiments, a top surface of the housing 1810 is a flat or contoured finished surface that is intended to improve esthetics of a video equipment platform. In the example shown, however, the video equipment platform 1800 includes a light system 1840. The light system 1840 is mounted on and carried by the top surface 1846 of the housing 1810, and includes a light source 1842 and a movable mount 1844. The light mount 1844 provides both pan and tilt features for the light source 1842 in the example shown. The housing 1810, and therefore the light system 1840, moves with the movable frame. The video equipment cradle 1830 and the video equipment 1832, however, move relative to the movable frame, and therefore relative to the light system 1840. The light system 1840 may be controllable independently of movement of the video equipment cradle 1830 and the video equipment 1832, or control may be integrated or linked to maintain desired lighting effects that are synchronized with or otherwise related to video equipment movement.

The embodiments described above are primarily in the context of video equipment platforms. Other embodiments, including method embodiments, are also contemplated.

Figures 19, 20:
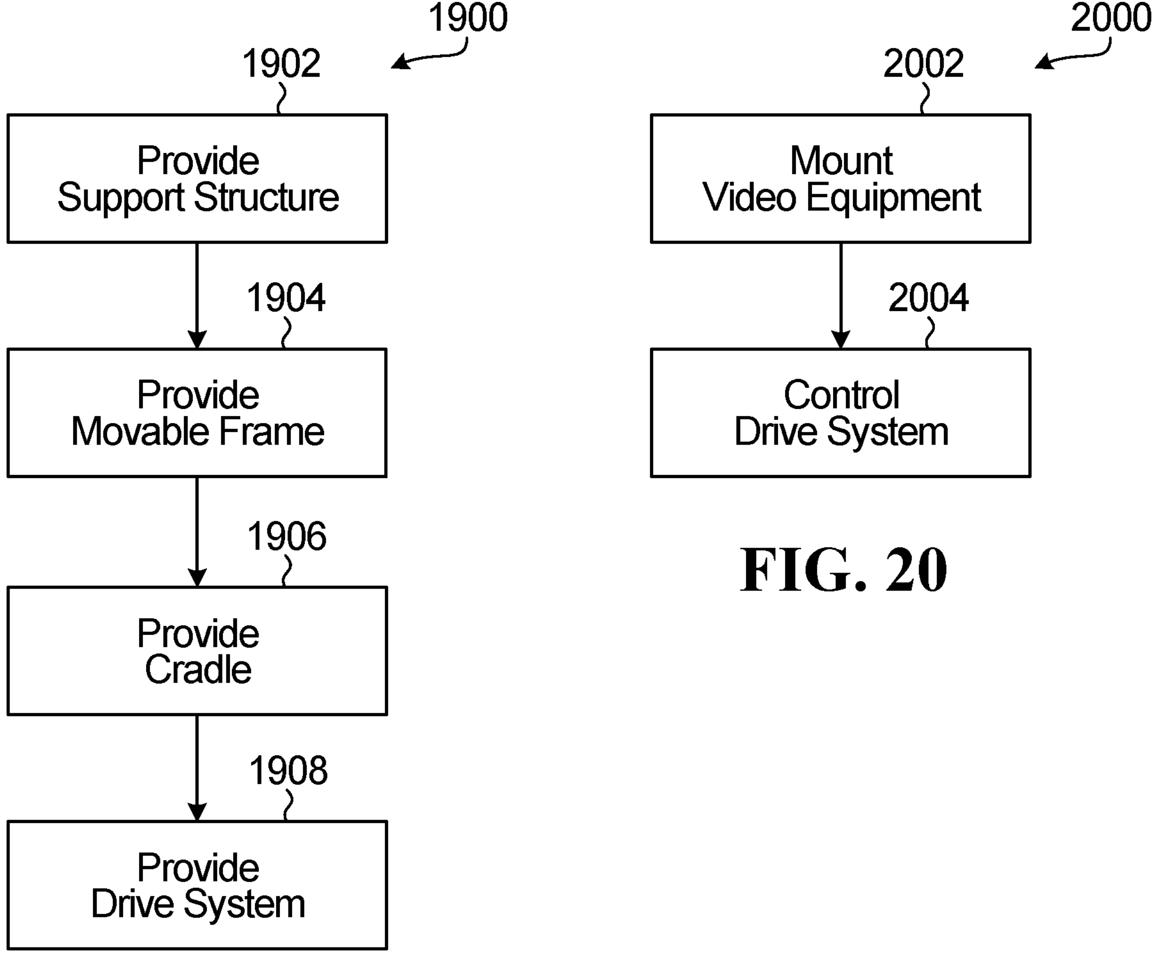
FIG. 19 is a flow diagram illustrating an example method according to an embodiment.
FIG. 20 is a flow diagram illustrating an example method according to another embodiment.

FIG. 19 is a flow diagram illustrating an example method according to an embodiment. The example method 1900 in FIG. 19 relates to manufacturing, assembling, constructing, or otherwise providing a video equipment platform.

The method 1900 involves providing a video equipment platform support structure at 1902, providing a movable frame coupled to and movable relative to the support structure at 1904, providing a video equipment cradle, coupled to and movable relative to the movable frame, to carry video equipment from within the movable frame at 1906, and providing a drive system at 1908. The drive system is coupled to the support structure, to the movable frame, and to the video equipment cradle, to move both the movable frame relative to the support structure and the video equipment cradle relative to the movable frame.

FIG. 19 illustrates providing several components of a video equipment platform. Assembly of those components is not separately shown in FIG. 19 in order to avoid congestion in the drawing.

In some embodiments, providing a movable frame coupled to and movable relative to the support structure at 1904 may involve coupling the movable frame to the support structure. Similarly, providing a video equipment cradle coupled to the movable frame at 1906 may involve coupling the video equipment cradle to the movable frame. Providing a drive system at 1908 may involve coupling the drive system to the support structure, to the movable frame, and to the video equipment cradle.

Although shown as separate operations in FIG. 19, in some embodiments multiple components of a video equipment platform may be provided as an integrated unit or otherwise provided together. For example, the support structure, the movable frame, and the drive system may be provided as an integrated unit, and the video equipment cradle may be a separate part that is coupled to the integrated unit during assembly or at deployment of a platform. Parts or components may also or instead be provided differently than shown. For example, parts of the support structure may be provided for assembly, to thereby provide the support structure.

The components referenced in FIG. 19 may be provided in any of various forms, examples of which are described at least above with reference to FIGS. 1 to 18.

For example, any one or more of the following features may be provided or supported in a method embodiment:

- providing the movable frame may involve providing a movable frame that includes linear side rails that are opposed to each other and linear end rails that are opposed to each other and extend between ends of the linear side rails;
- providing the support structure may involve providing a support structure that includes linear side rails that are opposed to each other and are respectively coupled to the linear side rails of the movable frame;
- a method may involve providing a respective coupling structure coupling each of the linear side rails of the support structure to a respective one of the linear side rails of the movable frame, and the providing may involve coupling each coupling structure to a respective one of the linear side of the support structure and a respective one of the linear side rails of the movable frame;
- providing a respective coupling structure may involve providing a coupling structure that includes a first component coupled to a respective one of the linear side rails of the support structure and a second component coupled to a respective one of the linear side rails of the movable frame, and the providing may involve coupling the first component to the respective one of the linear side rails of the support structure and coupling the second component to a respective one of the linear side rails of the movable frame;
- one of the first component and the second component may be received and retained within the other of the first component and the second component to couple the respective one of the linear side rails of the support structure to the respective one of the linear side rails of the movable frame, and be slidable within the other of the first component and the second component to enable the movable frame to move relative to the support structure;
- the video equipment cradle may be coupled to each of the linear side rails of the movable frame, and a method may involve coupling the video equipment cradle to each of the linear side rails of the movable frame;
- providing the drive system may involve providing a drive system that includes: a belt drive at a first end of the linear side rails of the movable frame, a belt idler at a second end of the linear side rails of the movable frame, and a belt extending between the belt drive and the belt idler and coupled to the support structure and to the video equipment cradle, and the providing may involve coupling the belt drive to the movable frame at a first end of the linear side rails of the movable frame, coupling the belt idler to the movable frame at a second end of the linear side rails of the movable frame, and extending the belt between the belt drive and the belt idler and coupling the belt to the support structure and to the video equipment cradle;
- the belt drive may include a drive motor mounted to the movable frame, and providing the drive system may include providing the drive motor mounted to the movable frame;
- providing the drive motor may involve mounting or otherwise coupling the drive motor to the movable frame;
- the belt drive may include a respective drive pulley at the first end of each of the linear side rails of the movable frame, in which case providing the drive system involves providing a belt drive that includes a respective drive pulley at the first end of each of the linear side rails of the movable frame, which may involve mounting or otherwise coupling a respective drive pulley to the movable frame at the first end of each of the linear side rails of the movable frame;
- the belt idler may include a respective idler pulley at the second end of each of the linear side rails of the movable frame, in which case providing the drive system involves providing a belt drive that includes a respective idler pulley at the second end of each of the linear side rails of the movable frame, which may involve mounting or otherwise coupling a respective idler pulley to the movable frame at the second end of each of the linear side rails of the movable frame;
- the belt may extend between one of the drive pulleys at the first end and one of the idler pulleys at the second end of one of the linear side rails of the movable frame;
- the belt drive may further include a second belt that extends between one of the drive pulleys at the first end and one of the idler pulleys and the second end of the other of the linear side rails of the movable frame, and providing the drive system may involve providing such a belt drive that further includes a second belt that extends between one of the drive pulleys at the first end and one of the idler pulleys and the second end of the other of the linear side rails of the movable frame, which may involve extending the second belt that between one of the drive pulleys at the first end and one of the idler pulleys and the second end of the other of the linear side rails of the movable frame;

the video equipment platform may also include a movable base coupled to the support structure and movable relative to a surface on which the video equipment platform is to be operated, in which case a method may involve providing a movable base coupled to the support structure and movable relative to a surface on which the video equipment platform is to be operated, which may involve coupling the movable base to the support structure;

the support structure may be rotatably coupled to the movable base, and a method may involve rotatably coupling the support structure to the movable base, so that the support structure is rotatable relative to the base about an axis of rotation that extends through the base;

the video equipment cradle may include a further drive system to controllably tilt the video equipment cradle relative to the movable frame, and a method may involve providing a further drive system to controllably tilt the video equipment cradle relative to the movable frame;

the video equipment platform may include one or more housings, and a method may involve providing a housing partially covering the support structure and a housing partially covering the movable frame, for example, with the housing partially covering the movable frame sized and arranged to be partially received within and to move partially within the housing partially covering the support structure;

providing the housings may involve sizing and arranging the housing partially covering the movable frame to be partially received within and to move partially within the housing partially covering the support structure.

Other components may also or instead be provided (which may involve coupling, mounting, or otherwise assembling each component with other components), and/or may be provided in different ways. For example, a method may involve providing components with features that are described above with reference to FIGS. 1 to 18.

More generally, the method 1900 is intended solely for illustrative purposes. Other embodiments could include fewer, additional, and/or different operations, performed in a similar or different order than shown, and operations could also or instead be performed in any of various ways. For example, any or all of the providing operations could involve manufacturing, purchasing, or otherwise acquiring the provided components.

FIG. 20 is a flow diagram illustrating an example method according to another embodiment. The example method 2000 in FIG. 20 relates to operation or use of a video equipment platform. The method involves, as shown at 2002, mounting video equipment to a video equipment cradle. The video equipment cradle is coupled to and movable relative to a movable frame of a video equipment platform, the video equipment cradle carries the video equipment from within the movable frame, and the movable frame coupled to and movable relative to a support structure of the video equipment platform. The example method 2000 also involves controlling a drive system that is coupled to the support structure, to the movable frame, and to the video equipment cradle, to move both the movable frame relative to the support structure and the video equipment cradle relative to the movable frame.

The controlling at 2004, and other control features, may be implemented using a controller and a control interface that enables communication with controllable components of the video equipment platform. In the example method 2000, the drive system is a controllable component. Other controllable components may be controllable through the same control interface and controller. Multiple control interfaces may be provided in other embodiments, and multiple controllers may also or instead be provided. It is expected, however, that a single controller, with one or more control interfaces, may be preferred. A controller could be part of the video equipment platform, or provided separately for remote control.

The method 2000 is intended solely for illustrative purposes. Other embodiments may include fewer, additional, and/or different operations, performed in a similar or different order than shown. Operations could also or instead be performed in any of various ways. Variations of the method 2000 could be or become apparent, for example, from the disclosure of platform embodiments with reference to FIGS. 1 to 18.

The following are examples of features disclosed herein, any one or more of which may be provided or supported in other method embodiments:

the movable frame may include linear side rails that are opposed to each other and linear end rails that are opposed to each other and extend between ends of the linear side rails;

the support structure may include linear side rails that are opposed to each other and are respectively coupled to the linear side rails of the movable frame;

the video equipment platform may include a respective coupling structure coupling each of the linear side rails of the support structure to a respective one of the linear side rails of the movable frame;

each coupling structure may include: a first component coupled to a respective one of the linear side rails of the support structure, and a second component coupled to a respective one of the linear side rails of the movable frame, with one of the first component and the second component being received and retained within the other of the first component and the second component to couple the respective one of the linear side rails of the support structure to the respective one of the linear side rails of the movable frame, and being slidable within the other of the first component and the second component to enable the movable frame to move relative to the support structure;

the video equipment cradle may be coupled to each of the linear side rails of the movable frame;

the drive system may include: a belt drive at a first end of the linear side rails of the movable frame; a belt idler at a second end of the linear side rails of the movable frame; and a belt extending between the belt drive and the belt idler and coupled to the support structure and to the video equipment cradle, in which case controlling the drive system may involve controlling the belt drive;

the belt drive may include a drive motor mounted to the movable frame, in which case controlling the drive system may involve controlling the drive motor;

the belt drive may include a respective drive pulley at the first end of each of the linear side rails of the movable frame;

the belt idler may include a respective idler pulley at the second end of each of the linear side rails of the movable frame;

the belt may extend between one of the drive pulleys at the first end and one of the idler pulleys at the second end of one of the linear side rails of the movable frame;

the belt drive may further include a second belt that extends between one of the drive pulleys at the first end and one of the idler pulleys and the second end of the other of the linear side rails of the movable frame;

the video equipment platform may further include: a movable base coupled to the support structure and movable relative to a surface on which the video equipment platform is to be operated, in which case a method may involve controlling the movable base to move the video equipment platform relative to the surface;

the support structure may be rotatably coupled to the movable base and be rotatable relative to the base about an axis of rotation that extends through the base, in which case a method may involve controlling rotation of the support structure relative to the base about the axis of rotation that extends through the base;

the video equipment cradle may include a further drive system to controllably tilt the video equipment cradle relative to the movable frame, in which case a method may involve controlling the further drive system to tilt the video equipment cradle relative to the movable frame;

the video equipment platform may further include: a housing partially covering the support structure and a housing partially covering the movable frame, with the housing partially covering the movable frame being sized and arranged to be partially received within and to move partially within the housing partially covering the support structure.

Embodiments herein may provide a large range of vertical camera motion whilst still being in a realistic package size, for transportation and commissioning for example, relative to other video equipment platform or lift designs.

A translating frame video equipment platform provides a compact operating footprint with a wide range of heights. Payload size and weight may vary between different applications or deployments, but as an example a video equipment platform may be designed to handle a payload weight of approximately 37 kg in an embodiment. A video equipment platform is neither intended nor expected to handle heavy weights.

What has been described is merely illustrative of the application of principles of embodiments of the present disclosure. Other arrangements and methods can be implemented by those skilled in the art.

For example, divisions of functions referenced herein are intended solely for illustrative purposes. Embodiments may be implemented with fewer, additional, and/or different components than those explicitly shown or otherwise referenced herein.

In addition, although described primarily in the context of apparatus, other implementations are also contemplated, in the form of methods and instructions stored on one or more non-transitory computer-readable storage media, for example.

The invention claimed is:

1. A video equipment platform comprising:

a support structure;

a movable frame coupled to and movable relative to the support structure;

a video equipment cradle, coupled to and movable relative to the movable frame, the video equipment cradle configured to carry video equipment from within the movable frame; and a drive system configured to move both the movable frame relative to the support structure and the video equipment cradle relative to the movable frame, the drive system coupled to (1) the support structure, (2) the movable frame, and (3) the video equipment cradle, wherein the movable frame comprises linear side rails that are opposed to each other and linear end rails that are opposed to each other and extend between ends of the movable frame linear side rails, and the support structure comprises linear side rails that are opposed to each other and are respectively coupled to the linear side rails of the movable frame.

2. The video equipment platform of claim 1, further comprising:

a respective coupling structure coupling each of the linear side rails of the support structure to a respective one of the linear side rails of the movable frame.

3. The video equipment platform of claim 2, wherein each coupling structure comprises:

a first component coupled to a respective one of the linear side rails of the support structure; and a second component coupled to a respective one of the linear side rails of the movable frame;

wherein one of the first component and the second component is received and retained within the other of the first component and the second component to couple the respective one of the linear side rails of the support structure to the respective one of the linear side rails of the movable frame, and is slidable within the other of the first component and the second component to enable the movable frame to move relative to the support structure.

4. The video equipment platform of claim 1, wherein the video equipment cradle is coupled to each of the linear side rails of the movable frame.

5. The video equipment platform of claim 1, wherein the drive system comprises:

a belt drive at a first end of the linear side rails of the movable frame;

a belt idler at a second end of the linear side rails of the movable frame;

a belt extending between the belt drive and the belt idler and coupled to the support structure and to the video equipment cradle.

6. The video equipment platform of claim 5, wherein the belt drive comprises a drive motor mounted to the movable frame.

7. The video equipment platform of claim 5, wherein the belt drive comprises a respective drive pulley at the first end of each of the linear side rails of the movable frame, the belt idler comprises a respective idler pulley at the second end of each of the linear side rails of the movable frame, the belt extends between one of the drive pulleys at the first end and one of the idler pulleys at the second end of one of the linear side rails of the movable frame, and the belt drive further comprises a second belt that extends between one of the drive pulleys at the first end and one of the idler pulleys and the second end of the other of the linear side rails of the movable frame.

8. The video equipment platform of claim 1, further comprising:

a movable base coupled to the support structure and movable relative to a surface on which the video equipment platform is to be operated.

9. The video equipment platform of claim 1, wherein the video equipment cradle comprises a further drive system to controllably tilt the video equipment cradle relative to the movable frame.

10. A method comprising:

providing a video equipment platform support structure;

providing a movable frame coupled to and movable relative to the support structure, wherein the movable frame comprises linear side rails that are opposed to each other and linear end rails that are opposed to each other and extend between ends of the linear side rails of the moveable frame, and the support structure comprises linear side rails that are opposed to each other and are respectively coupled to the linear side rails of the movable frame;

providing a video equipment cradle, coupled to and movable relative to the movable frame, to carry video equipment from within the movable frame; and providing a drive system to move both the movable frame relative to the support structure and the video equipment cradle relative to the movable frame, wherein the drive system is coupled to (1) the support structure, (2) the movable frame, and (3) the video equipment cradle.

11. The method of claim 10, wherein providing a video equipment cradle coupled to the movable frame comprises coupling the video equipment cradle to the movable frame.

12. The method of claim 10, wherein providing a drive system coupled to (1) the support structure, (2) the movable frame, and (3) the video equipment cradle comprises coupling the drive system to the support structure, to the movable frame, and to the video equipment cradle.

13. The method of claim 10, wherein providing a video equipment platform support structure and providing a movable frame coupled to and movable relative to the support structure comprises providing a respective coupling structure coupling each of the linear side rails of the support structure to a respective one of the linear side rails of the movable frame.

14. The method of claim 13, wherein providing a respective coupling structure coupling each of the linear side rails of the support structure to a respective one of the linear side rails of the movable frame comprises:

providing a first component coupled to a respective one of the linear side rails of the support structure; and providing a second component coupled to a respective one of the linear side rails of the movable frame, wherein one of the first component and the second component is received and retained within the other of the first component and the second component to couple the respective one of the linear side rails of the support structure to the respective one of the linear side rails of the movable frame, and is slidable within the other of the first component and the second component to enable the movable frame to move relative to the support structure.

15. The method of claim 10, wherein providing a drive system coupled to (1) the support structure, (2) the movable frame, and (3) the video equipment cradle comprises:

providing a belt drive at a first end of the linear side rails of the movable frame;

providing a belt idler at a second end of the linear side rails of the movable frame; and providing a belt extending between the belt drive and the belt idler and coupled to the support structure and to the video equipment cradle.

16. The method of claim 10, further comprising:

providing a movable base coupled to the support structure and movable relative to a surface on which the video equipment platform support structure, the movable frame, the video equipment cradle, and the drive system are to be operated.

17. The method of claim 10, wherein providing a video equipment cradle comprises providing a further drive system to controllably tilt the video equipment cradle relative to the movable frame.

18. A method comprising:

mounting video equipment to a video equipment cradle that is coupled to and movable relative to a movable frame of a video equipment platform, the video equipment cradle carrying the video equipment from within the movable frame, the movable frame coupled to and movable relative to a support structure of the video equipment platform, wherein the movable frame comprises linear side rails that are opposed to each other and linear end rails that are opposed to each other and extend between ends of the linear side rails of the movable frame, and the support structure comprises linear side rails that are opposed to each other and are respectively coupled to the linear side rails of the movable frame;

controlling a drive system to move both the movable frame relative to the support structure and the video equipment cradle relative to the movable frame, wherein the drive system is coupled to (1) the support structure, (2) the movable frame, and (3) the video equipment cradle.

19. The method of claim 18, further comprising:

controlling a movable base to move the video equipment platform relative to a surface on which the video equipment platform is to be operated, wherein the movable base is coupled to the support structure.

20. The method of claim 18, further comprising:

controlling a further drive system to tilt the video equipment cradle relative to the movable frame.

* * * * *